(12) United States Patent
Oleshko et al.

(10) Patent No.: US 11,876,211 B2
(45) Date of Patent: Jan. 16, 2024

(54) PRELITHIATED LITHIUM ION BATTERY AND MAKING A PRELITHIATED LITHIUM ION BATTERY

(71) Applicant: Government of the United States of America, as represented by the Secretary of Commerce, Gaithersburg, MD (US)

(72) Inventors: Vladimir Pavlovich Oleshko, Gaithersburg, MD (US); Christopher Lloyd Soles, Boyds, MD (US); Jabez Jenkins McClelland, Bethesda, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 412 days.

(21) Appl. No.: 17/018,898

(22) Filed: Sep. 11, 2020

(65) Prior Publication Data

US 2021/0075001 A1 Mar. 11, 2021

Related U.S. Application Data

(60) Provisional application No. 62/898,886, filed on Sep. 11, 2019.

(51) Int. Cl.
*H01M 4/134* (2010.01)
*H01M 10/0525* (2010.01)
(Continued)

(52) U.S. Cl.
CPC ......... *H01M 4/134* (2013.01); *H01M 4/0423* (2013.01); *H01M 4/1395* (2013.01);
(Continued)

(58) Field of Classification Search
CPC .......... Y02E 60/10; Y02P 70/50; Y02T 10/70; H01M 4/134; H01M 4/1395; H01M 4/661; H01M 4/666
See application file for complete search history.

(56) References Cited

U.S. PATENT DOCUMENTS 8,530,853 B2 * 9/2013 Steele ................... H01J 27/022
250/423 P
9,385,397 B2 7/2016 Zhamu et al.
(Continued)

OTHER PUBLICATIONS

Xu, K., et al., "Li1-solvation/desolvation dictates interphasial processes on graphitic anode in Li ion cells", Journal of Materials Research, 2012, p. 2327-2341, vol. 27 No.18.
(Continued)

*Primary Examiner* — Amanda C. Walke
(74) *Attorney, Agent, or Firm* — Office of Chief Counsel for National Institute of Standards and Technology

(57) ABSTRACT

A prelithiated lithium ion battery includes: ion beam implanted lithium; a cathode; and an anode disposed on the cathode and an electrolyte in electrical communication with the cathode and the anode, the cathode or the anode including the ion beam implanted lithium such that: when the cathode includes the ion beam implanted lithium, the ion beam implanted lithium is present in an absence of solid electrolyte interface composition in the cathode; and when the anode includes the ion beam implanted lithium, the ion beam implanted lithium is present in an absence of solid electrolyte interface composition in the anode.

16 Claims, 19 Drawing Sheets

(51) Int. Cl.
- H01M 4/04 (2006.01)
- H01M 4/66 (2006.01)
- H01M 4/1395 (2010.01)
- H01M 50/409 (2021.01)

(52) U.S. Cl.
CPC ....... H01M 4/661 (2013.01); H01M 10/0525 (2013.01); H01M 50/409 (2021.01)

(56) References Cited

U.S. PATENT DOCUMENTS

| | | | |
|---|---|---|---|
| 9,966,598 B2 | 5/2018 | Cui et al. | |
| 2013/0045427 A1* | 2/2013 | Zhamu | H01M 10/0525 977/734 |
| 2021/0013490 A1* | 1/2021 | Lin | H01M 4/133 |

OTHER PUBLICATIONS

Shanmukaraj, D., et al., "Sacrificial salts: Compensating the initial charge irreversibility in lithium batteries", Electrochemistry Communications, 2010, p. 1344-1347, vol. 12.

Zhao, J., et al., "Metallurgically lithiated SiOx anode with high capacity and ambient air compatibility", PNAS, 2016, p. 7408-7413, vol. 113 No. 27.

Liu, N., et al., "Prelithiated Silicon Nanowires as an Anode for Lithium Ion Batteries", ACS Nano, 2011, p. 6487-6493, vol. 5 No.8.

Hassoun, J., et al., "An Advanced Lithium Ion Battery Based on High Performance Electrode Materials", Journal of the American Chemical Society, 2011, p. 3139-3143, vol. 133.

Jezowski, P., et al., "Lithium rhenium(VII) oxide as a novel material for graphite pre-lithiation in high performance lithiumion capacitors", 2016, p. 12609-12615, vol. 4.

Jarvis, C.R., et al., "A prelithiated carbon anode for lithium-ion battery applications", Journal of Power Sources, 2006, p. 800-802, vol. 162.

Wang, Z., et al., "Application of Stabilized Lithium Metal Powder (SLMP) in graphite anode e A high efficient brelithiation method for lithium-ion batteries", Journal of Power Sources, 2014, p. 57-61, vol. 260.

Zhou, H., et al., "Li-Metal-Free Prelithiation of Si-Based Negative Electrodes for Full Li-Ion Batteries", Chem. Sus. Chem., 2015, p. 2737-2744, vol. 8.

Wu, Z., et al., "Pan. Prelithiation Activates Li(Ni0.5Mn0.3Co0.2)O2 for High Capacity and Excellent Cycling Stability" Nano Letters, 2015, p. 5590-5596, vol. 15.

Xu, N., et al., "Stationary Full Li-Ion Batteries with Interlayer-Expanded V6O13 Cathodes and Lithiated Graphite Anodes", Electrochimica Acta, 2016, p. 171-177, vol. 203.

Ye, F., et al., Prelithiation of Nanostructured Sulfur Cathode by an "On-Sheet" Solid-State Reaction, Small, 2016, p. 4966-4972, vol. 12 No. 36.

Sun, Y., et al., "High-capacity battery cathode prelithiation to offset initial lithium loss", Nature Energy, 2016, p. 15008, vol. 1.

Krause, A., "High Area Capacity Lithium-Sulfur Full-cell Battery with Prelitiathed Silicon Nanowire-Carbon Anodes for Long Cycling Stability", Scientific Reports, 2016, p. 27982, vol. 6.

Kim, H.J., et al., "Controlled Prelithiation of Silicon Monoxide for High Performance Lithium-Ion Rechargeable Full Cells", Nano Letters, 2016, p. 282-288, vol. 16.

Marinaro, M., et al., "Toward pre-lithiated high areal capacity silicon anodes for Lithium-ion batteries", Electrochimica Acta, 2016, p. 99-107, vol. 206.

Abe, Y., et al., "Effect of Prelithiation Process for Hard Carbon Negative Electrode on the Rate and Cycling Behaviors of Lithium-Ion Batteries", 2018, p. 71, vol. 4.

* cited by examiner

Making interdigitated 3D Li ion microbattery with pre-lithiated enhanced high capacity anode and liquid electrolyte

PRELITHIATED LITHIUM ION BATTERY AND MAKING A PRELITHIATED LITHIUM ION BATTERY

CROSS REFERENCE TO RELATED APPLICATION

This application claims the benefit of U.S. Provisional Patent Application Ser. No. 62/898,886 filed Sep. 11, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, MD, 20899; voice (301) 301-975-2573; email tpo@nist.gov; reference NIST Docket Number 18-030US1.

BRIEF DESCRIPTION

Disclosed is a prelithiated lithium ion battery comprising: ion beam implanted lithium; a cathode; and an anode disposed on the cathode and in electrical communication with the cathode, the cathode or the anode comprising the ion beam implanted lithium such that: when the cathode comprises the ion beam implanted lithium, the ion beam implanted lithium is present in an absence of solid electrolyte interface composition in the cathode; and when the anode comprises the ion beam implanted lithium, the ion beam implanted lithium is present in an absence of solid electrolyte interface composition in the anode.

Disclosed is a process for making a prelithiated lithium ion battery, the process comprising: disposing a first battery member in a vacuum environment; subjecting the first battery member to a lithium ion beam comprising lithium ions; implanting lithium ions from the lithium ion beam in the first battery member to prelithiate the first battery member; disposing a second battery member on a first battery member; disposing a third battery member on the second battery member so that the second battery member is interposed between the first battery member and the third battery member to form a prelithiated battery composite; and annealing the prelithiated battery composite to form the prelithiated lithium ion battery such that the prelithiated lithium ion battery has an absence of a solid electrolyte interface composition in a portion of the first battery member subjected to implanting the lithium ions from the lithium ion beam.

Disclosed is a process for making a prelithiated lithium ion battery, the process comprising: disposing electrode particles in a vacuum environment; subjecting the electrode particles to a lithium ion beam comprising lithium ions; implanting lithium ions from the lithium ion beam in the electrode particles to prelithiate the electrode particles with ion beam implanted lithium; combining, after implanting lithium ions in the electrode particles, the electrode particles with a conductive additive and a binder to form an electrode composition; disposing, as a first electrode, the electrode composition on a first current collector to form a first electrode member such that the first electrode comprises the ion beam implanted lithium that is present in absence of solid electrolyte interface composition is present in absence of solid electrolyte interface composition in the first electrode; annealing the first electrode member; and disposing the first electrode member on a second electrode member to make the prelithiated lithium ion battery.

Disclosed is a process for making a prelithiated lithium ion battery, the process comprising: forming a first current collector; forming a cathode on the first current collector; forming an electrolyte on the cathode; forming an anode on the cathode; subjecting the anode to a lithium ion beam comprising lithium ions; implanting lithium ions from the lithium ion beam in the anode to prelithiate the anode with ion beam implanted lithium such that the anode comprises the ion beam implanted lithium that is present in absence of solid electrolyte interface composition in is present in absence of solid electrolyte interface composition in the anode; annealing the anode after implanting lithium ions in the anode; forming a second current collector on the anode; and annealing the second current collector to form the prelithiated lithium ion battery.

Disclosed is a process for making a prelithiated lithium ion battery, the process comprising: forming a first current collector; forming a second current collector; forming a cathode on the first current collector, the cathode comprising an interdigitated structure that is in electrical communication with the first current collector; forming an anode on the second current collector, the anode comprising a second interdigitated structure that is in electrical communication with the second current collector; subjecting the anode to a lithium ion beam comprising lithium ions; implanting lithium ions from the lithium ion beam in the anode to prelithiate the anode with ion beam implanted lithium such that the anode comprises the ion beam implanted lithium that is present in absence of solid electrolyte interface composition in is present in absence of solid electrolyte interface composition in the anode; annealing the anode and the cathode after implanting lithium ions in the anode; and disposing an electrolyte on the on the cathode and the anode so that lithium ions are communicated through the electrolyte from the anode to the cathode or from the cathode to the anode to make the prelithiated lithium ion battery.

BRIEF DESCRIPTION OF THE DRAWINGS

The following description should not be considered limiting in any way. With reference to the accompanying drawings, like elements are numbered alike.

DETAILED DESCRIPTION

Figure 1:
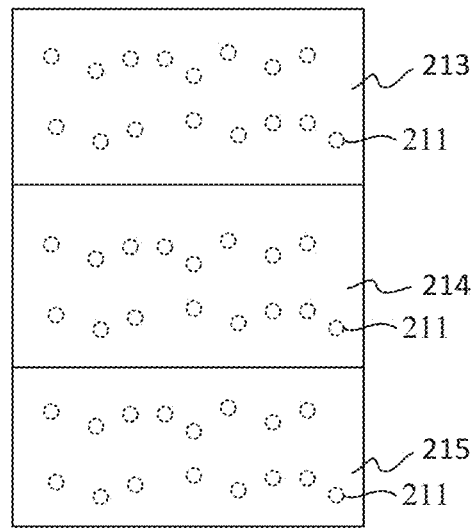
FIG. 1 shows a prelithiated lithium ion battery.

A detailed description of one or more embodiments is presented herein by way of exemplification and not limitation.

It has been discovered that a prelithiated lithium ion battery and process for making the prelithiated lithium ion battery provide doping and modifying battery components with lithium ions (Li$^+$) by ion implantation under vacuum, i.e., in a vacuum environment, without solvents or wet chemistry processing for dry prelithiation of battery components that increases an amount of active Li$^+$ in the component. Active Li$^+$ refers to lithium ion available during electrolyte electrochemical charge or discharge of the prelithiated lithium ion battery. Without wishing to be bound by theory, it is believed that the ion beam implanted lithium present in components of the prelithiated lithium ion battery is included as in an amorphized solid state. Advantageously, articles and processes herein reduce an amount of side reactions of electrode materials with liquid electrolyte to increase capacity of the prelithiated lithium ion battery as compared with conventional lithium ion batteries. Articles and processes herein provide rechargeable cell systems such as lithium-ion cells, lithium-metal cells, lithium-sulfur cells, lithium-air cells, lithium-carbon cells (e.g., a lithium-graphene cell or a lithium-carbon nanotube cell), or a lithium-ion supercapacitor, including symmetric and asymmetric ultracapacitors, or hybrid energy storage or conversion systems that use lithium ions. The process for making the prelithiated lithium ion battery includes dry, unsolvated, lithium ions in a vacuum environment and overcomes technical problems with conventional wet or solvent-based electrochemical making of batteries that include unwanted side reactions of Li$^+$ that consume lithium. Beneficially, the prelithiated lithium ion battery and processes described provide direct dry lithiation using Li$^+$ implanted into electrode material in vacuum. Various Li$^+$ sources, e.g., lithium fast ion beam, provide a clean way to implant Li$^+$ that overcomes complications from side reactions of lithium that occur in conventional wet chemical or electrochemical processing. Moreover, prelithiation of components of prelithiated lithium ion battery overcomes problems of loss of mobile Li$^+$ in electrode materials to improve performance of prelithiated lithium ion battery compared with conventional devices by providing relatively greater Coulombic efficiency during initial cycle and subsequent cycle of operation of the battery with greater rate capability, capacity retention, energy, and power density.

Prelithiation and modification of battery components via dose-controlled lithium ion implantation can enhance battery performance and can be applied to electrochemical energy storage devices (e.g., batteries, supercapacitors, hybrid systems, and the like) that include selected areas of thin sheet or film electrodes, current collectors, or separators; particles (e.g., a solid powder) for a cathode or anode; or solid electrolyte material that can be Li$^+$ source in the prelithiated lithium ion battery.

Figure 2:
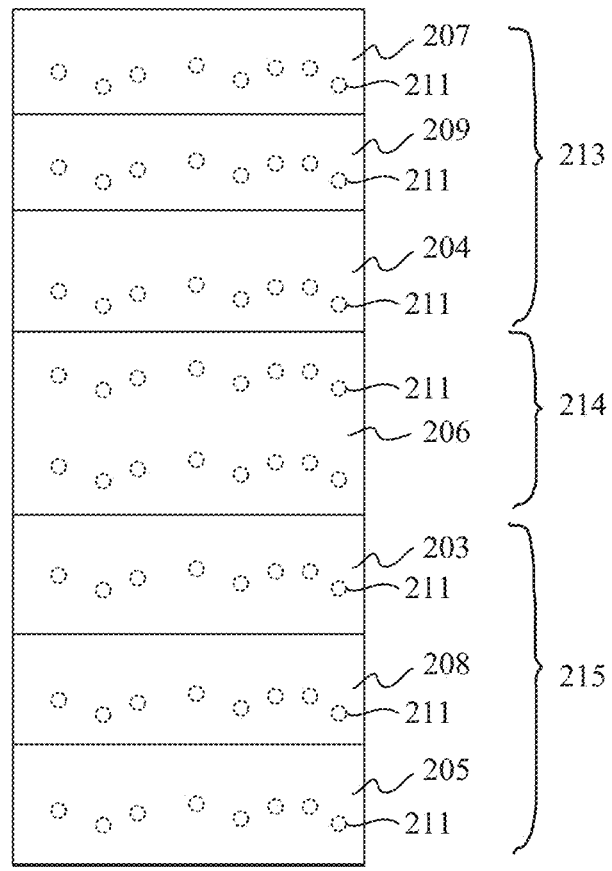
FIG. 2 shows a prelithiated lithium ion battery.

In an embodiment, with reference to FIG. 1 and FIG. 2, prelithiated lithium ion battery 200 includes: ion beam implanted lithium 211; cathode 204; and anode 203 disposed on cathode 204 and in electrical communication with cathode 204, cathode 204 or anode 203 including ion beam implanted lithium 211 such that: when cathode 204 includes ion beam implanted lithium 211, ion beam implanted lithium 211 is present in cathode 204 prior to the SET formation; and when anode 203 includes ion beam implanted lithium 211, ion beam implanted lithium 211 is present in anode 203 prior to the SEI formation.

In an embodiment, prelithiated lithium ion battery 200 further includes separator 206 interposed between anode 203 and cathode 204 and in electrical communication with anode 203 and cathode 204 such that lithium ions from ion beam implanted lithium 211 communicate from anode 203 to cathode 204 or from cathode 204 to anode 203 through separator 206. According to an embodiment, separator 206 includes ion beam implanted lithium 211 prior to communication of lithium ions from any of anode 203 or cathode 204.

an embodiment, prelithiated lithium ion battery 200 includes cathode current collector 207 disposed on cathode 204 such that cathode 204 is interposed between anode 203 and cathodic current collector 207 with cathode current collector 207 in electrical communication with cathode 204. According to an embodiment, cathodic current collector 207 includes ion beam implanted lithium 211 prior to communication of lithium ions from cathode 204 and any other portion of prelithiated lithium ion battery 200. Cathode primer 209 can be disposed on cathode 204 such that cathodic primer 209 is interposed between cathode current collector 207 and cathode 204 with cathodic primer 209 in electrical communication with cathode 204 and cathode current collector 207. Further, cathode primer 209 can include ion beam implanted lithium 211 prior to communication of lithium ions from cathode 204 and any other portion of prelithiated lithium ion battery 200.

In an embodiment, prelithiated lithium ion battery 200 includes anode current collector 205 disposed on anode 203 such that anode 203 is interposed between cathode 204 and anodic current collector 205 with anode current collector 205 in electrical communication with anode 203. According to an embodiment, anode current collector 205 includes ion beam implanted lithium 211 prior to communication of lithium ions from anode 203 and any other portion of prelithiated lithium ion battery 200. Anode primer 208 can be disposed on anode 203 such that anodic primer 208 is interposed between anode current collector 205 and anode 203 with anode primer 208 in electrical communication with anode 203 and anode current collector 205. Anode primer 208 can include ion beam implanted lithium 211 prior to communication of lithium ions from anode 203 and any other portion of prelithiated lithium ion battery 200.

In an embodiment, cathode 204 includes electrode particles 219; and ion beam implanted lithium 211 disposed in electrode particles 219 prior to communication of lithium ions from anode 203 and any other portion of prelithiated lithium ion battery 200. According to an embodiment, anode 203 includes electrode particles 219; and ion beam implanted lithium 211 disposed in electrode particles 219 prior to communication of lithium ions from cathode 204 and any other portion of prelithiated lithium ion battery 200.

Figure 3:
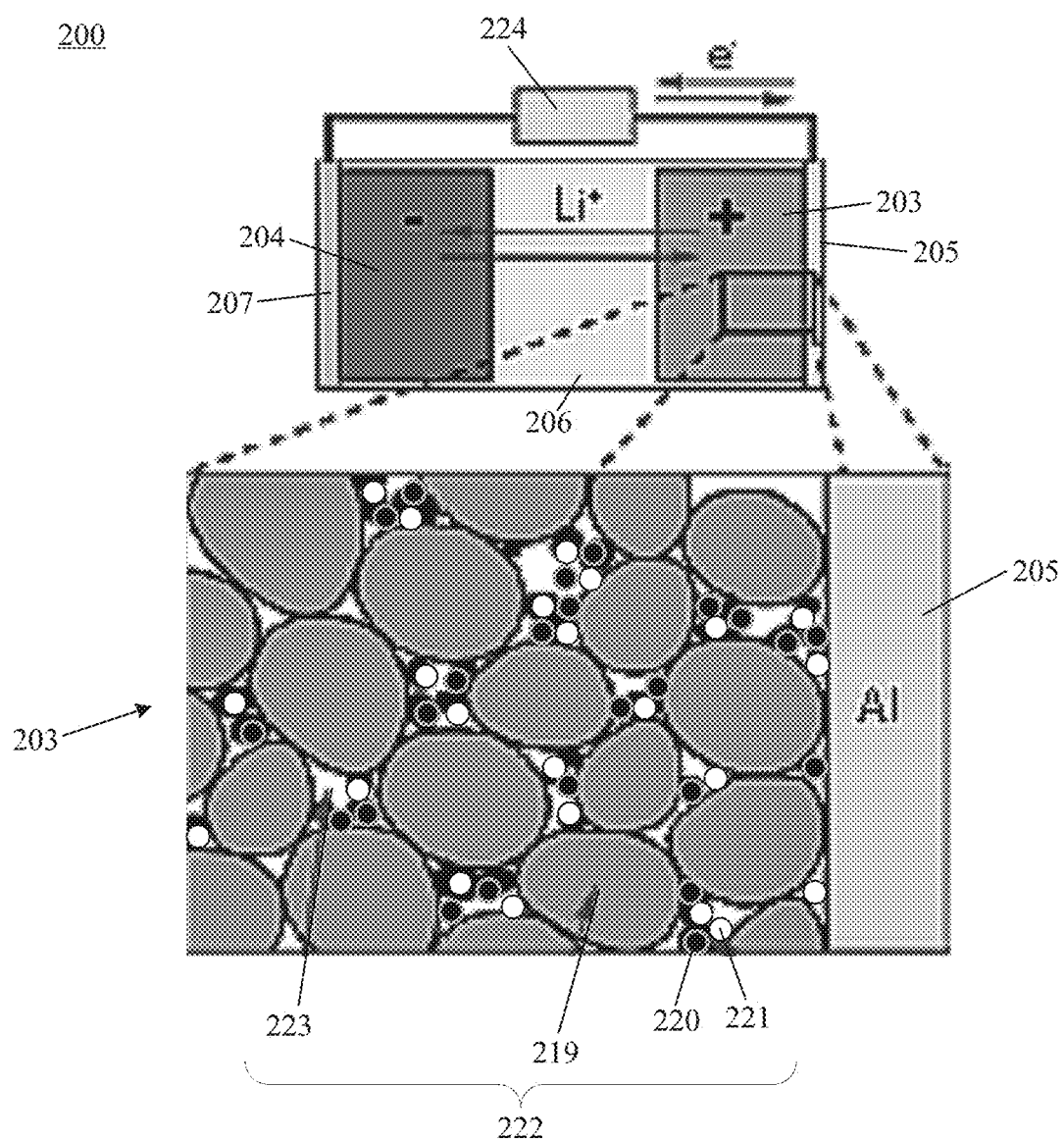
FIG. 3 shows a prelithiated lithium ion battery.

In an embodiment, with reference to FIG. 3, prelithiated lithium ion battery 200 includes anode 203 that includes electrode composition 222 including electrode particles 219, conductive additive 220, and binder 221 disposed among electrolyte 223; anode current collector 205 on which anode 203 is disposed; separator 206 disposed on anode 203; cathode 204 disposed on separator 206; cathodic current collector 207 disposed on cathode 204; and optional load 224 in electrical communication with anodic current collector 205 and cathode current collector 207 and through which electrons can flow in a reversible direction in relation to communication of lithium ions communicated through separator 206 from anode 203 to cathode 204 or from cathode 204 to anode 203.

Figure 4:
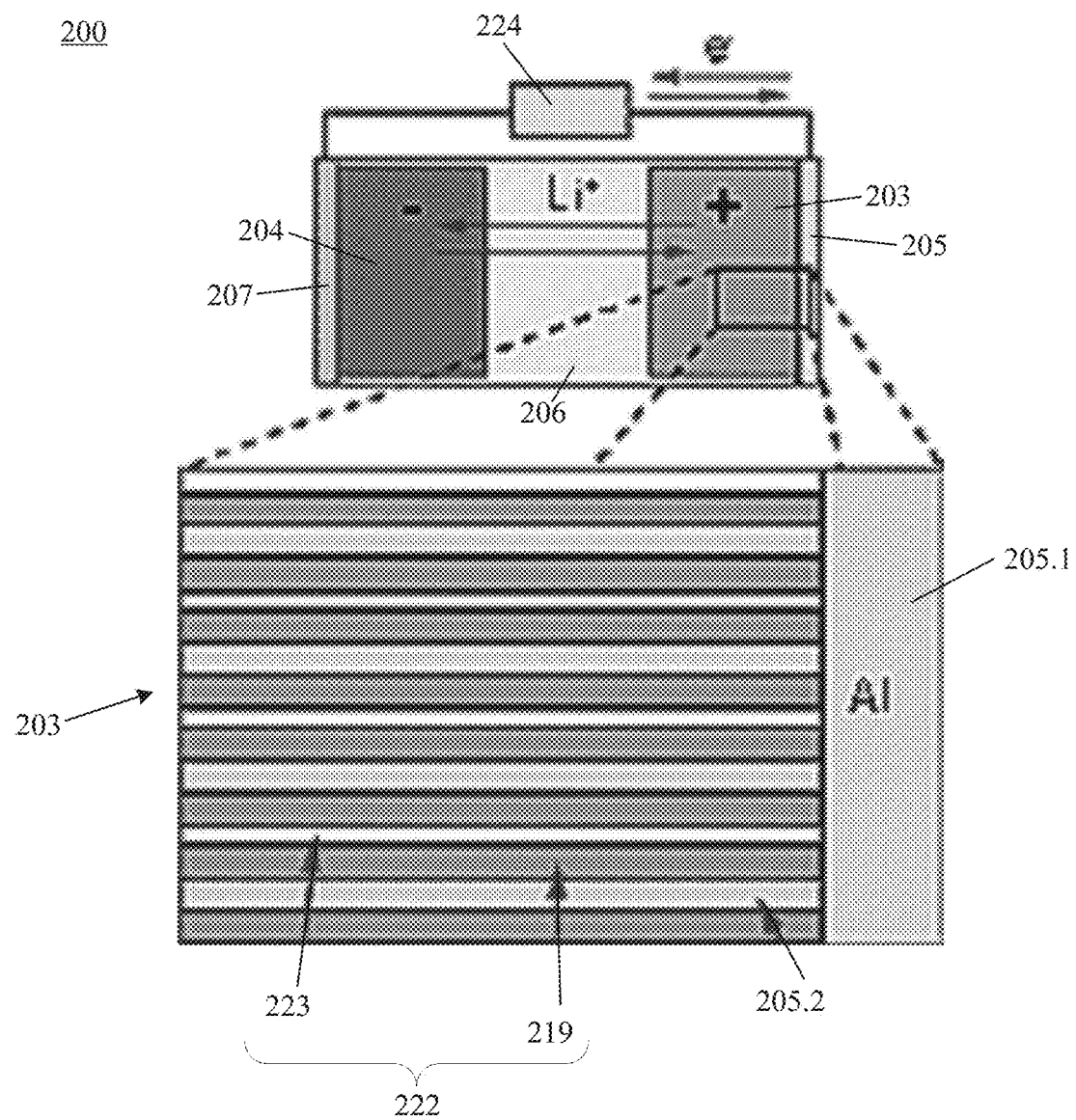
FIG. 4 shows a prelithiated lithium ion battery.

In an embodiment, with reference to FIG. 4, prelithiated lithium ion battery 200 includes anode 203 that includes electrode composition 222 including electrode particles 219 disposed among electrolyte 223 and alteration layers of second anodic current collector 205.2; first anodic current collector 205.1 on which anode 203 is disposed; separator 206 disposed on anode 203; cathode 204 disposed on separator 206; cathodic current collector 207 disposed on cathode 204; and optional load 224 in electrical communication with first anode current collector 205.1 and cathode current collector 207 and through which electrons can flow in a reversible direction in relation to communication of lithium ions communicated through separator 206 from anode 203 to cathode 204 or from cathode 204 to anode 203.

Figure 5:
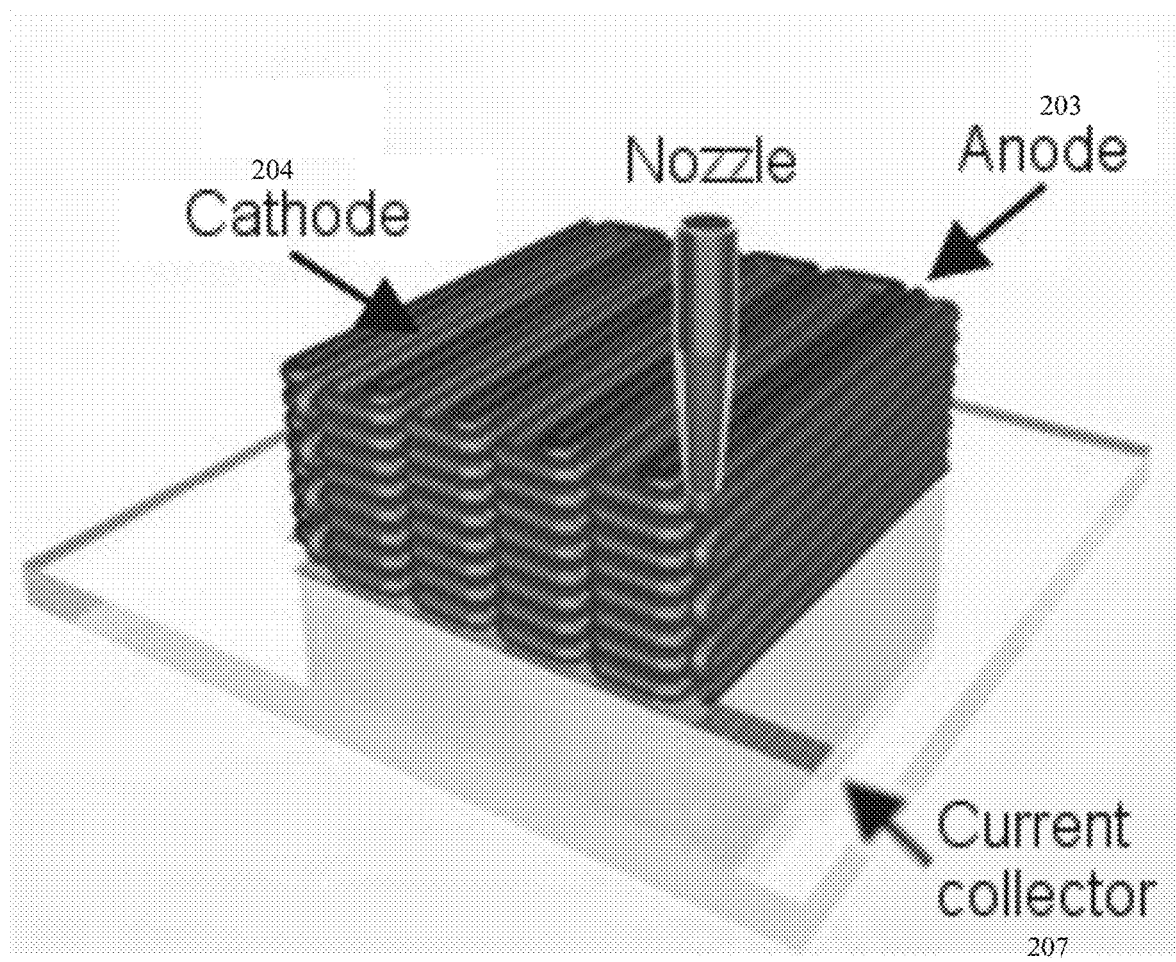
FIG. 5 shows a prelithiated lithium ion battery.

In an embodiment, with reference to FIG. 5, prelithiated lithium ion battery 200 includes a first current collector as cathode current collector 207; cathode 204 on the first current collector, cathode 204 including an interdigitated structure that is in electrical communication with the first current collector; a second current collector as anode current collector 205; anode 203 on the second current collector, anode 203 including a second interdigitated structure that is in electrical communication with the second current collector, wherein anode 203 is prelithiated with ion beam implanted lithium that is present n anode 203 prior the SEI formation; and an electrolyte disposed on cathode 204 and anode 203 so that lithium ions are communicated through the electrolyte from anode 203 to cathode 204 or from cathode 204 to anode 203.

In an embodiment, prelithiated lithium ion battery 200 includes various formats such as a cylindrical format shown in panel A with cathode 204 and anode 203 in electrical communication via separator 206 and disposed in battery can 225 with terminals 226 disposed at termini of battery can 225. As shown in panel B, a prismatic format of prelithiated lithium ion battery 200 includes cathode 204 and anode 203 in electrical communication via separator 206 and disposed in battery can 225 with terminals 226 disposed on battery can 225. As shown in panel C, a pouch format of prelithiated lithium ion battery 200 includes a plurality of alternating layers of cathode 204, separator 206, anode 203 disposed in pouch 227 with terminals 226.

In an embodiment, prelithiated lithium ion battery 200 includes a cathode; an anode, ion beam implanted lithium, and an electrolyte in electrical communication with the cathode and the anode. The ion beam implanted lithium may be incorporated in the cathode, incorporated in the anode, incorporated in a separator, incorporated in current collectors of the battery. The ion beam implanted lithium incorporated in the components of the battery creates internal sub-surface reservoirs of mobile lithium ions in an excess of stoichiometry, which compensate for lithium losses due to the formation of SEI, stabilize the SEI and induce controlled solid-state amorphization and modification of the active electrode materials by creating structural defects, dangling bonds, diffusion channels, and connectivity pathways that enable to facilitate ion transport and improve the performance of the battery during electrochemical charge-discharge cycling under optimized processing conditions.

In an embodiment, a process for making a prelithiated lithium ion battery, the process comprising: disposing a first battery member in a vacuum environment; subjecting the first battery member to a lithium ion beam comprising lithium ions; implanting lithium ions from the lithium ion beam in the first battery member to prelithiate the first battery member; disposing a second battery member on a first battery member; disposing a third battery member on the second battery member so that the second battery member is interposed between the first battery member and the third battery member to form a prelithiated battery composite; and annealing the prelithiated battery composite to form the prelithiated lithium ion battery such that the prelithiated lithium ion battery has ion beam implanted lithium that creates internal sub-surface reservoirs of mobile lithium ions in an excess of stoichiometry, which compensate for lithium losses due to the formation of the SEI, stabilizes the SEI and induces controlled solid-state amorphization and modification of a portion of the first battery member subjected to implanting the lithium ions from the lithium ion beam by creating structural defects, dangling bonds, diffusion channels, and pathways that enable to facilitate ion transport and improve the performance of the battery during electrochemical charge-discharge cycling under optimized processing conditions.

In an embodiment, a process for making a prelithiated lithium ion battery, the process comprising: disposing electrode particles in a vacuum environment; subjecting the electrode particles to a lithium ion beam comprising lithium ions; implanting lithium ions from the lithium ion beam in the electrode particles to prelithiate the electrode particles with ion beam implanted lithium; combining, after implanting lithium ions in the electrode particles, the electrode particles with a conductive additive and a binder to form an electrode composition; disposing, as a first electrode, the electrode composition on a first current collector to form a first electrode member such that the first electrode comprises the ion beam implanted lithium that creates internal sub-surface reservoirs of mobile lithium ions in an excess of stoichiometry, which compensate for lithium losses due to the formation of the SEI, stabilizes the SET and induces controlled solid-state amorphization and modification of the first electrode by creating structural defects, dangling bonds, diffusion channels, and pathways that enable to facilitate ion transport and improve the performance of the battery during electrochemical charge-discharge cycling under optimized processing conditions; annealing the first electrode member; and disposing the first electrode member on a second electrode member to make the prelithiated lithium ion battery.

In an embodiment, a process for making a prelithiated lithium ion battery, the process comprising: forming a first current collector; forming a cathode on the first current collector; forming an electrolyte on the cathode; forming an anode on the cathode; subjecting the anode to a lithium ion beam comprising lithium ions; implanting lithium ions from the lithium ion beam in the anode to prelithiate the anode with ion beam implanted lithium such that the anode comprises the ion beam implanted lithium that creates internal sub-surface reservoirs of mobile lithium ions in an excess of stoichiometry, which compensate for lithium losses due to the formation of the SEI, stabilizes the SEI and induces controlled solid-state amorphization and modification of the anode by creating structural defects, dangling bonds, diffusion channels, and pathways that enable to facilitate ion transport and improve the performance of the battery during electrochemical charge-discharge cycling under optimized processing conditions; annealing the anode after implanting lithium ions in the anode; forming a second current collector on the anode; and annealing the second current collector to form the prelithiated lithium ion battery.

In an embodiment, a process for making a prelithiated lithium ion battery, the process comprising: forming a first current collector; forming a second current collector; forming a cathode on the first current collector, the cathode comprising an interdigitated structure that is in electrical communication with the first current collector; forming an anode on the second current collector, the anode comprising a second interdigitated structure that is in electrical communication with the second current collector; subjecting the anode to a lithium ion beam comprising lithium ions; implanting lithium ions from the lithium ion beam in the anode to prelithiate the anode with ion beam implanted lithium such that the anode comprises the ion beam implanted lithium that creates internal sub-surface reservoirs of mobile lithium ions in an excess of stoichiometry, which compensate for lithium losses due to the formation of the SEI, stabilizes the SEI and induces controlled solid-state amorphization and modification of the anode by creating structural defects, dangling bonds, diffusion channels, and pathways that enable to facilitate ion transport and improve the performance of the battery during electrochemical charge-discharge cycling under optimized processing conditions; annealing the anode and the cathode after implanting lithium ions in the anode; and disposing an electrolyte on the on the cathode and the anode so that lithium ions are communicated through the electrolyte from the anode to the cathode or from the cathode to the anode to make the prelithiated lithium ion battery.

Components of prelithiated lithium ion battery 200 can be made from and include various materials. Anode 203 (also referred to as a negative electrode) can receive or provide $Li^+$ from ion beam implanted lithium 211. Anode 203 provides mechanical structure for disposition of other elements of prelithiated lithium ion battery 200 thereon. Anode 203 can include a carbon (e.g., carbon, mesocarbon, soft carbon, hard carbon, carbon black, activated carbon, graphite, pyrolytic graphite, exfoliated graphite, carbon fiber, carbon nanofiber, carbon nanotube, graphene flake, graphene oxide, nitrogen doped graphene, graphene fluoride, graphene fiber, graphene whisker, and coke); silicon, germanium, tin, lead, antimony, bismuth, zinc, aluminum, cadmium, or stoichiometric or non-stoichiometric alloys thereof with other elements; oxide, carbide, nitride, sulfide, phosphide, selenide, or telluride of silicon, germanium, tin, lead, antimony, bismuth, zinc, aluminum, iron, titanium, manganese, cobalt, molybdenum, tungsten, cadmium, or combination thereof including a composite thereof; or a combination including at least one of the foregoing. A thickness of anode 203 can be from 1 nm to 1 cm, specifically from 1 μm to 10 mm, and more specifically from 10 μm to 100 μm. A density of ion beam implanted lithium 211 in anode 203 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$. In an embodiment, anode 203 is silicon.

Cathode 204 (also referred to as a positive electrode) can receive or provide Li+ from ion beam implanted lithium 211. Cathode 204 can be a lithiated or non-lithiated transition metal oxide (e.g., lithium cobalt oxide, lithium manganese dioxide, or lithium manganese composite oxide, lithium nickel oxide, lithium vanadium oxide, or lithium iron phosphate; cobalt dioxide, vanadium oxide), transition metal dichalcogenide such as titanium disulfate, molybdenum disulfate, tungsten disulfate, molybdenum diselenide, tungsten diselenide, or a combination thereof. A thickness of cathode 204 can be from 1 nm to 1 cm, specifically from 1 μm to 10 mm, and more specifically from 10 μm to 100 μm. A density of ion beam implanted lithium 211 in cathode 204 can be from 0 atoms/cm$^3$ to $10^{10}$ atoms/cm$^3$, specifically from 100 atoms/cm$^3$ to $10^8$ atoms/cm$^3$, and more specifically froth 1000 atoms/cm$^3$ to $10^5$ atoms/cm$^3$. In an embodiment, cathode 204 is silicon.

Anode current collector 205 is compatible with the anode and electrolyte without causing corrosion and can receive or provide electrons as electrical current, voltage, or charge accumulation with uniform current distribution and low contact resistance to minimize anode polarization during cycling. Anode current collector 205 can include a copper, nickel, and aluminum metals and alloys, graphite and other conductive carbons, conductive ceramic, and polymers. A thickness of anode current collector 205 can be from 1 nm to 1 cm, specifically from 1 μm to 10 mm, and more specifically from 10 μm to 100 μm. A density of ion beam implanted lithium 211 in anode current collector 205 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Separator 206 electrically and spatially separates electrodes (203, 204) and can receive or provide Li+ from ion beam implanted lithium 211, facilitating diffusion of Li+ between electrodes (e.g., 203, 204), and. Separator 206 is formed from a porous material soaked with electrolyte and communicates with the electrodes (203, 204). Separator 206 can be formed from polymers such as polyethylene, polypropylene, or polyvinylidene fluoride, ceramic or glass. A thickness of separator 206 can be from 1 nm to 1 cm, specifically from 1 μm to 10 mm, and more specifically from 10 μm to 100 μm. A density of ion beam implanted lithium 211 in separator 206 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Cathodic current collector 207 can receive or provide electrons as electrical current, voltage, or charge accumulation. Anodic current collector 205 can include copper, aluminum, nickel metals and alloys, graphite and conductive carbons, conductive ceramic, and polymers. A thickness of cathodic current collector 207 can be from 1 nm to 1 cm, specifically from 1 μm to 10 mm, and more specifically from 10 μm to 100 μm. A density of ion beam implanted lithium 211 in cathode current collector 207 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Primer layers for enhancing adhesive strength between the current collector and the electrode and maintaining stability of the battery under operating conditions without increasing internal resistance. Primer layers (e.g., anode primer 208, cathode primer 209) independently can include conductive carbons and polymeric binders. A thickness of primer layers (e.g., anode primer 208, cathode primer 209) independently can be from 1 nm to 1 cm, specifically from 1 μm to 10 mm, and more specifically from 10 μm to 100 μm. A density of ion beam implanted lithium 211 in primers (e.g., anode primer 208, cathode primer 209) independently can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Figure 18:
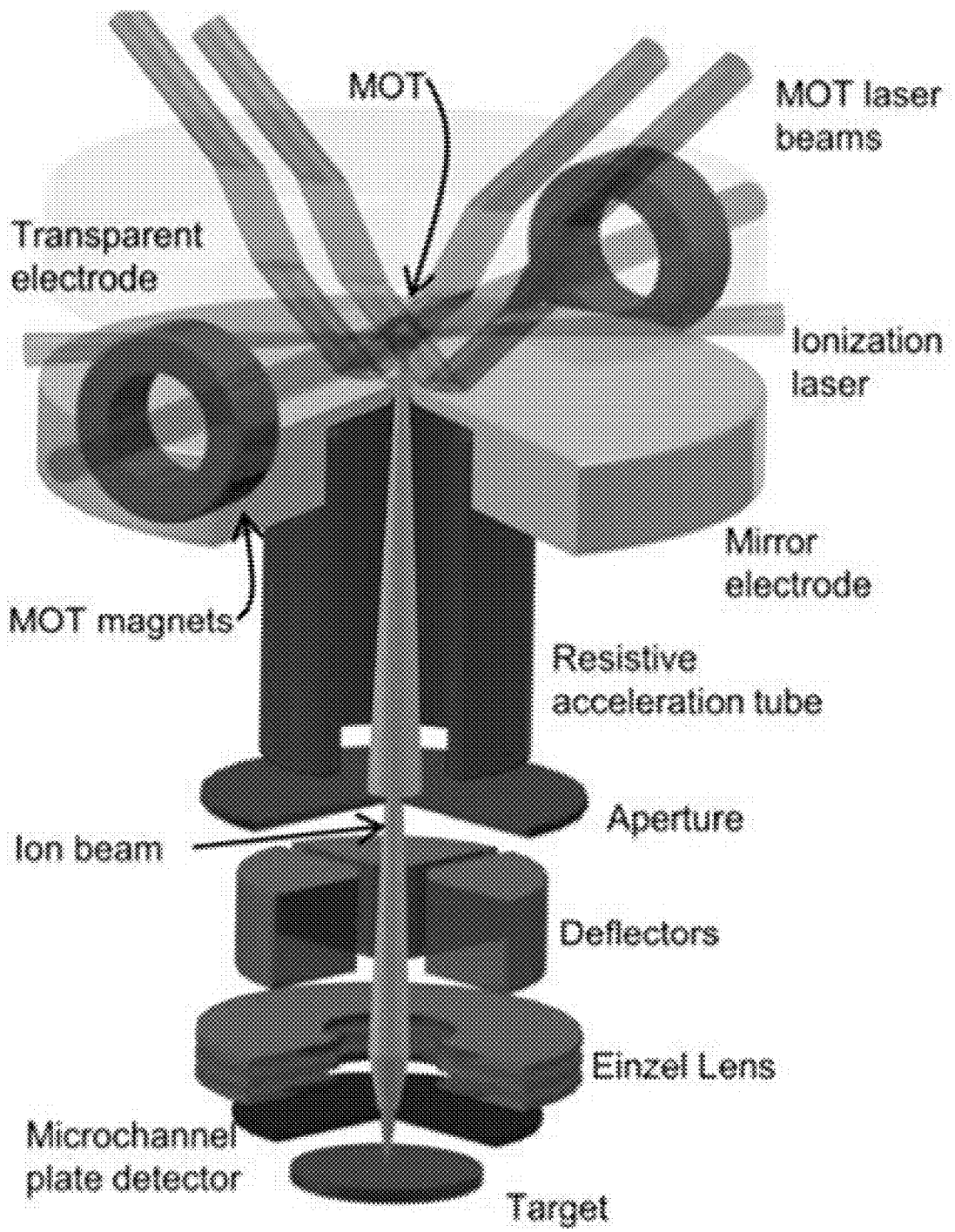
FIG. 18 shows an exemplary lithium ion beam source.

Lithium ion beam 210 can provide lithium ions. Lithium ion beam 210 can include lithium ions in isolation or in combination with a diluent gas such as argon, helium, and the like. Lithium ion beam 210 has an absence of material that can form solid electrolyte interface composition in a presence of lithium implanted from Li$^+$ in lithium ion beam 210. An exemplary source for making lithium ion beam 210 is a field emission source, fast ion bombardment source, flood source, and the like, e.g., MOTIS source shown in FIG. 18. A diameter of lithium ion beam 210 can be from 1 nm to 1 cm, specifically from 1 μm to 10 mm, and more specifically from 10 μm to 100 μm. A cross-sectional shape of lithium ion beam 210 can be formed or manipulated by ion optics and can be scanned across a surface in a raster or other pattern. It is contemplated that a length or width of lithium ion beam 210 can be from 1 nm to 1 cm, specifically from 1 μm to 10 mm, and more specifically from 10 μm to 100 μm. A flux of lithium ions in lithium ion beam 210 can be from 0 ions/cm$^2$s to $10^8$ ions/cm$^2$s, specifically from 1 ion/cm$^2$s to $10^6$ ions/cm$^2$s, and more specifically from 10 ions/cm$^2$s to 1000 ions/cm$^2$s. A number density of lithium ions lithium ion beam 210 can be from 0 ions/cm$^3$ to $10^{10}$ ions/cm$^3$, specifically from 100 ions/cm$^3$ to $10^8$ ions/cm$^3$, and more specifically from 1000 ions/cm$^3$ to $10^5$ ions/cm$^3$. Further, lithium ion beam 210 can have an energy from 1 eV to 1 MeV, specifically from 100 eV to 100 keV, and more specifically from 1000 eV to 10 keV. In an embodiment, lithium ion beam 210 is configured to have dimension and shape matching the substrate size and shape such that entire surface is implanted at a depth of 0.1 μm to 10 μm without changing any parameters. In another embodiment, lithium ion beam 210 is in the form of a narrow beam that is scanned across the substrate surface to implant ions at a depth of 0.1 μm to 10 μm.

Ion beam implanted lithium 211 provide lithium ions as electrical current, voltage, or charge accumulation in prelithiated lithium ion battery 200. Ion beam implanted lithium 211 can include lithium atoms as an atomic species in absence of lithium-containing molecules or lithium ions as ionic species Li$^+$ in absence of lithium-containing complex ions. A thickness, e.g., a depth of penetration in a component (e.g., anode 203, cathode 204, and the like) of prelithiated lithium ion battery 200 due to implantation of lithium ions from lithium ion beam 210, of ion beam implanted lithium 211 can be from 1 nm to 1 cm, specifically from 1 μm to 10 mm, and more specifically from 10 μm to 100 μm. A density of ion beam implanted lithium 211 in a component (e.g., anode 203, cathode 204, and the like) of prelithiated lithium ion battery 200 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Prelithiated lithium ion battery 200 overcomes issues of conventional lithium ion batteries that include solid electrolyte interface composition. In operating a conventional lithium ion battery, solid electrolyte interface composition accordingly incorporates lithium and decreases an amount of lithium that available as Li$^+$ for communication as electrical charge in the conventional lithium ion battery. Since lithium ion beam 210 implants ion beam implanted lithium 211 directly in components of (e.g., anode 203, cathode 204, and the like) of prelithiated lithium ion battery 200, it should be appreciated that lithium in ion beam implanted lithium 211 does not form solid electrolyte interface composition and is freely available from ion beam implanted lithium 211 as Li+ to communicate as electrical charge in prelithiated lithium ion battery 200.

In making prelithiated lithium ion battery 200, a vacuum environment 217 is used during implantation of lithium ions as ion beam implanted lithium 211 from lithium ion beam 210. Vacuum environment 217 can be provided as vacuum chamber with a selected base pressure or pumping speed. The vacuum chamber can accommodate reception of a lithium ion source, communication of lithium ion beam 210 from the lithium ion source, and material for implantation of lithium ions. The base pressure can be selected to provide a suitable mean free path of lithium ion beam 210 from the lithium ion source to a selected target such as electrode particles, anode 203, cathode 204, and the like.

Electrode particles 219 can be subjected to lithium ion beam 210 and receive Li+ from lithium ion beam 210 for disposal of Li+ as ion beam implanted lithium 211. Electrode particles 219 with ion beam implanted lithium 211 can be subjected to processing to form an electrode (e.g., anode 203 or cathode 204). Electrode particles 219 can include a silicon, quartz, gallium arsenide, metal, plastic, glass, ceramic, polymer, and the like. A diameter of electrode particles 219 can be from 1 nm to 1 cm, specifically from 1 μm to 10 mm, and more specifically from 10 μm to 100 μm. A density of ion beam implanted lithium 211 in electrode particles 219 can be from 0 atoms/cm$^3$ to $10^{10}$ atoms/cm$^3$, specifically from 100 atoms/cm$^3$ to $10^8$ atoms/cm$^3$, and more specifically from 1000 atoms/cm$^3$ to $10^5$ atoms/cm$^3$.

Compositions can be prepared for making electrodes. In an embodiment, electrode composition 222 can be disposed on a member such as a current collector (e.g., anodic current collector 205 or cathodic current collector 207) to form an electrode (anode 203 or cathode 204). Electrode composition 222 can include electrode particles 219, conductive additive 220, and electrode composition 222. It is contemplated that optional additives.

Conductive additive 220 provides electrical conductivity in electrodes (203, 204) for communication of Li+ through electrodes. By adding conductive additive 220, lithium ion conductivity can be increased. Therefore, a conduction path for lithium ions in electrodes can be provided, and an internal resistance prelithiated lithium ion battery 200 can be reduced. As a result, an amount of a current that can flow through the lithium ion conduction path increases, and charge-discharge characteristics of prelithiated lithium ion battery 200 are improved. Conductive additive 220 can include acetylene black, carbon black, graphite, carbon fibers, and carbon nanotubes, and the like. A thickness of conductive additive 220 can be from 1 nm to 1 cm, specifically from 1 μm to 10 mm, and more specifically from 10 μm to 100 μm.

Binder 221 binds together components of an electrode (e.g., 203, 204) as a monolithic structure that can be shaped, disposed conformally on another component such as a current collector, or modify electrical conductivity in electrodes (203, 204). Binder 221 can include acetylene black, carbon black, graphite, carbon fibers, and carbon nanotubes, and the like. A thickness of binder 221 can be from 1 nm to 1 cm, specifically from 1 μm to 10 mm, and more specifically from 10 μm to 100 μm.

Electrolyte 223 provides an electrically conductive medium to communicate $Li^+$ from anode 203 to cathode 204 or from cathode 204 to anode 203. Electrolyte 223 can be a liquid such as lithium salts, such as $LiPF_6$, $LiBF_4$LiTFSI, or $LiCl_4$, dissolved in an organic solvent, such as ethylene carbonate, dimethyl carbonate, and diethyl carbonate. Electrolyte 223 can be polymeric, typically polyethylene oxide) based gels or solids, also formulated similar lithium ion salts. They can also be solid lithium metal oxides, which allow lithium ion transport through the solid more readily due to the intrinsic lithium content. A thickness of electrolyte 223 can be from 1 nm to 1 cm, specifically from 1 μm to 10 mm, and more specifically from 10 μm to 100 μm. Electrolyte 223 can be a condensed medium such as a solid, liquid, glass, or gel with a selected viscosity. A viscosity of electrolyte 223 can be as low as 1 centipoise for a liquid electrolyte or completely rigid (non-viscous) in the case of a solid electrolyte.

Prelithiated lithium ion battery 200 can be made in various ways. In an embodiment, with reference to FIG. 1, FIG. 2, FIG. 6, FIG. 7, FIG. 8, FIG. 9, FIG. 10, and FIG. 12, a process for making prelithiated lithium ion battery 200 includes disposing first battery member 201 in vacuum environment 217; subjecting first battery member 201 to lithium ion beam 210 including ion beam implanted lithium 211; implanting ion beam implanted lithium 211 from lithium ion beam 210 in first battery member 201 to prelithiate first battery member 201; disposing second battery member 202 on first battery member 201; disposing third battery member 216 on second battery member 202, so that second battery member 202 is interposed between first battery member 201 and third battery member 216 to form prelithiated battery composite 218; and annealing prelithiated battery composite 218 to form prelithiated lithium ion battery 200 such that prelithiated lithium ion battery 200 has an absence of solid electrolyte interface composition in a portion of first battery member 201 subjected to implanting ion beam implanted lithium 211 from lithium ion beam 210.

In an embodiment, the process for making prelithiated lithium ion battery 200 further includes, prior to disposing second battery member 202 on first battery member 201 subjecting second battery member 202 to lithium ion beam 210; and implanting ion beam implanted lithium 211 from lithium ion beam 210 in second battery member 202 to prelithiate second battery member 202. According to an embodiment, the process further includes, prior to disposing third battery member 216 on second battery member 202: subjecting third battery member 216 to lithium ion beam 210; and implanting ion beam implanted lithium 211 from lithium ion beam 210 in third battery member 216 to prelithiate second battery member 202;

In an embodiment, the process for making prelithiated lithium ion battery 200 further includes, prior to disposing third battery member 216 on second battery member 202: subjecting third battery member 216 to lithium ion beam 210; and implanting ion beam implanted lithium 211 from lithium ion beam 210 in third battery member 216 to prelithiate second battery member 202.

In an embodiment, the process for making prelithiated lithium ion battery 200, first battery member 201 includes cathodic member 213 or anodic member 215; second battery member 202 includes intermediate member 214; when first battery member 201 is cathodic member 213, third battery member 216 includes anodic member 215; and when first battery member 201 is anodic member 215, third battery member 216 includes cathodic member 213. In an embodiment, first battery member 201 includes cathodic member 213; and third battery member 216 includes anodic member 215. According to an embodiment, first battery member 201 includes anodic member 215; and third battery member 216 includes cathodic member 213.

Figure 13:
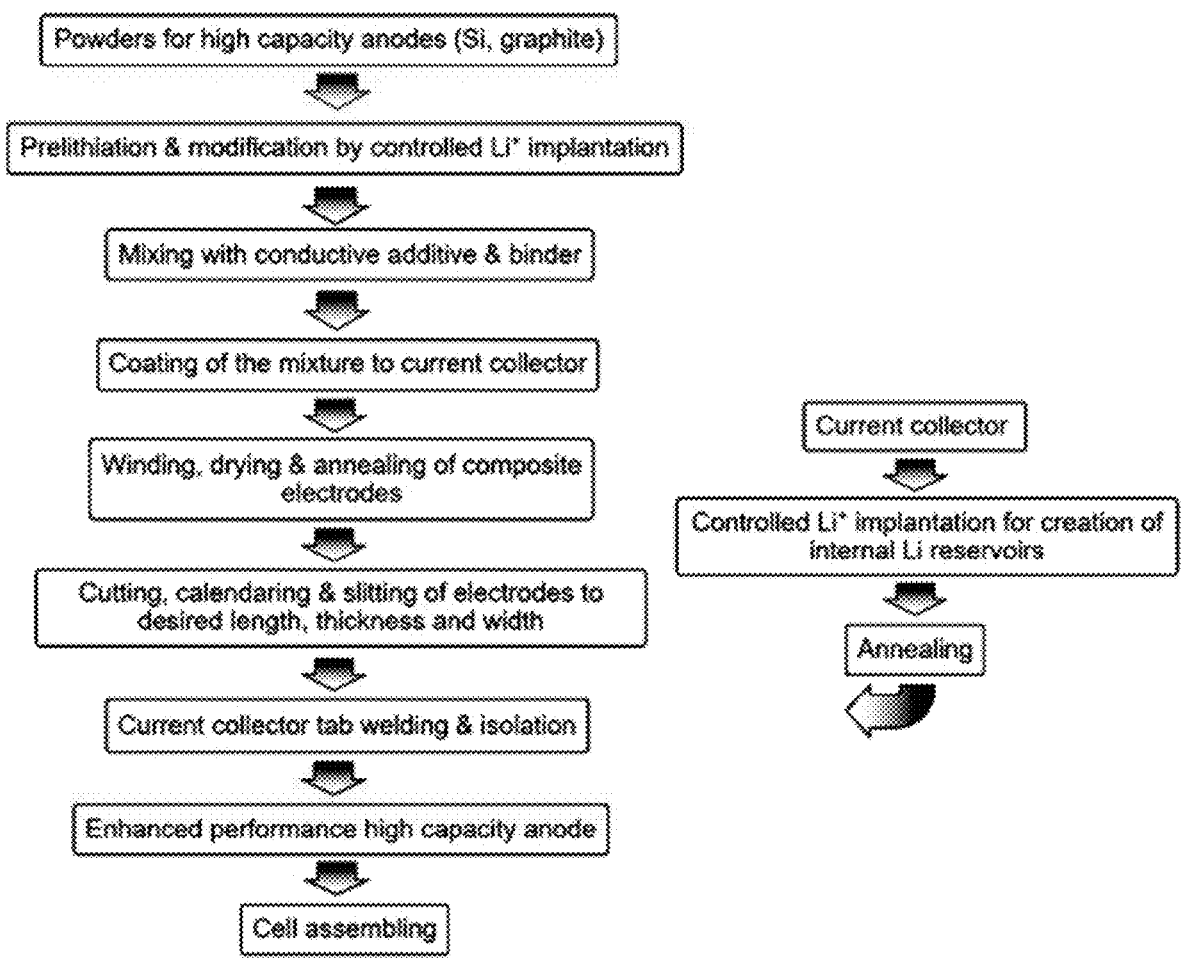
FIG. 13 shows steps in making a prelithiated lithium ion battery using electrode particles.

In an embodiment, with reference to FIG. 3 and FIG. 13, a process for making prelithiated lithium ion battery 200 includes: disposing electrode particles 219 in vacuum environment 217; subjecting electrode particles 219 to lithium ion beam 210 including ion beam implanted lithium 211; implanting ion beam implanted lithium 211 from lithium ion beam 210 in electrode particles 219 to prelithiate electrode particles 219 with ion beam implanted lithium; combining, after implanting ion beam implanted lithium 211 in electrode particles 219, electrode particles 219 with conductive additive 220 and binder 221 to form an electrode composition 222; disposing, as a first electrode, electrode composition 222 on a first current collector to form a first electrode member such that first electrode includes ion beam implanted lithium that is present in absence of solid electrolyte interface composition in first electrode; annealing the first electrode member; and disposing the first electrode member on a second electrode member to make prelithiated lithium ion battery 200.

This process also can include, prior to disposing the first electrode on the first current collector: subjecting the first current collector to lithium ion beam 210 including ion beam implanted lithium 211; implanting ion beam implanted lithium 211 from lithium ion beam 210 in the first current collector to prelithiate the first current collector with ion beam implanted lithium, wherein the first current collector includes ion beam implanted lithium that is present in absence of solid electrolyte interface composition in the first current collector; and annealing the first current collector.

This process also can include, prior to disposing the first electrode member on the second electrode member: disposing, as a second electrode, electrode composition 222 on a second current collector to form the second electrode member such that the second electrode includes ion beam implanted lithium that is present in absence of solid electrolyte interface composition in the second electrode; and annealing the second electrode member.

The process can further include, prior to disposing the second electrode on the second current collector: subjecting the second current collector to lithium ion beam 210 including ion beam implanted lithium 211; implanting ion beam implanted lithium 211 from lithium ion beam 210 in the second current collector to prelithiate the second current collector with ion beam implanted lithium, wherein second current collector includes ion beam implanted lithium that is present in absence of solid electrolyte interface composition in the second current collector; and annealing the first current collector.

Figure 14:
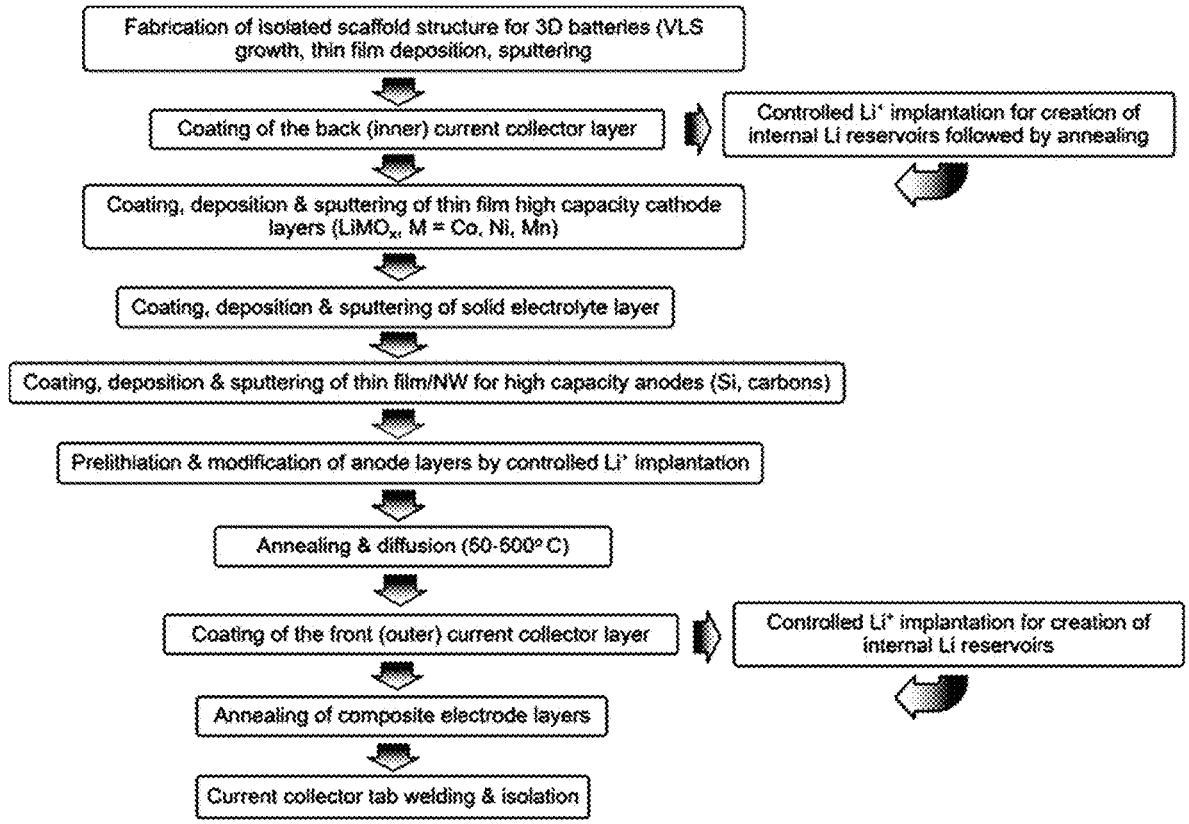
FIG. 14 shows steps in making a prelithiated lithium ion battery that includes a plurality of layers in the electrodes.

In an embodiment, with reference to FIG. 4 and FIG. 14, a process for making prelithiated lithium ion battery 200 includes: forming a first current collector; forming cathode 204 on the first current collector; forming electrolyte 223 on cathode 204; forming anode 203 on cathode 204; subjecting anode 203 to lithium ion beam 210 including ion beam implanted lithium 211; implanting ion beam implanted lithium 211 from lithium ion beam 210 in anode 203 to prelithiate anode 203 with ion beam implanted lithium such that anode 203 includes ion beam implanted lithium that is present in absence of solid electrolyte interface composition in anode 203; annealing anode 203 after implanting ion beam implanted lithium 211 in anode 203; forming a second current collector on anode 203; and annealing the second current collector to form prelithiated lithium ion battery 200.

The process further can include, prior to forming cathode 204 on the first current collector: subjecting the first current collector to lithium ion beam 210 including ion beam implanted lithium 211; implanting ion beam implanted lithium 211 from lithium ion beam 210 in the first current collector to prelithiate the first current collector with ion beam implanted lithium; and annealing the first current collector after implanting ion beam implanted lithium 211 in the first current collector.

The process further can include, prior to annealing the second current collector: subjecting the second current collector to lithium ion beam 210 including ion beam implanted lithium 211; and implanting ion beam implanted lithium 211 from lithium ion beam 210 in the second current collector to prelithiate the second current collector with ion beam implanted lithium.

Figure 15:
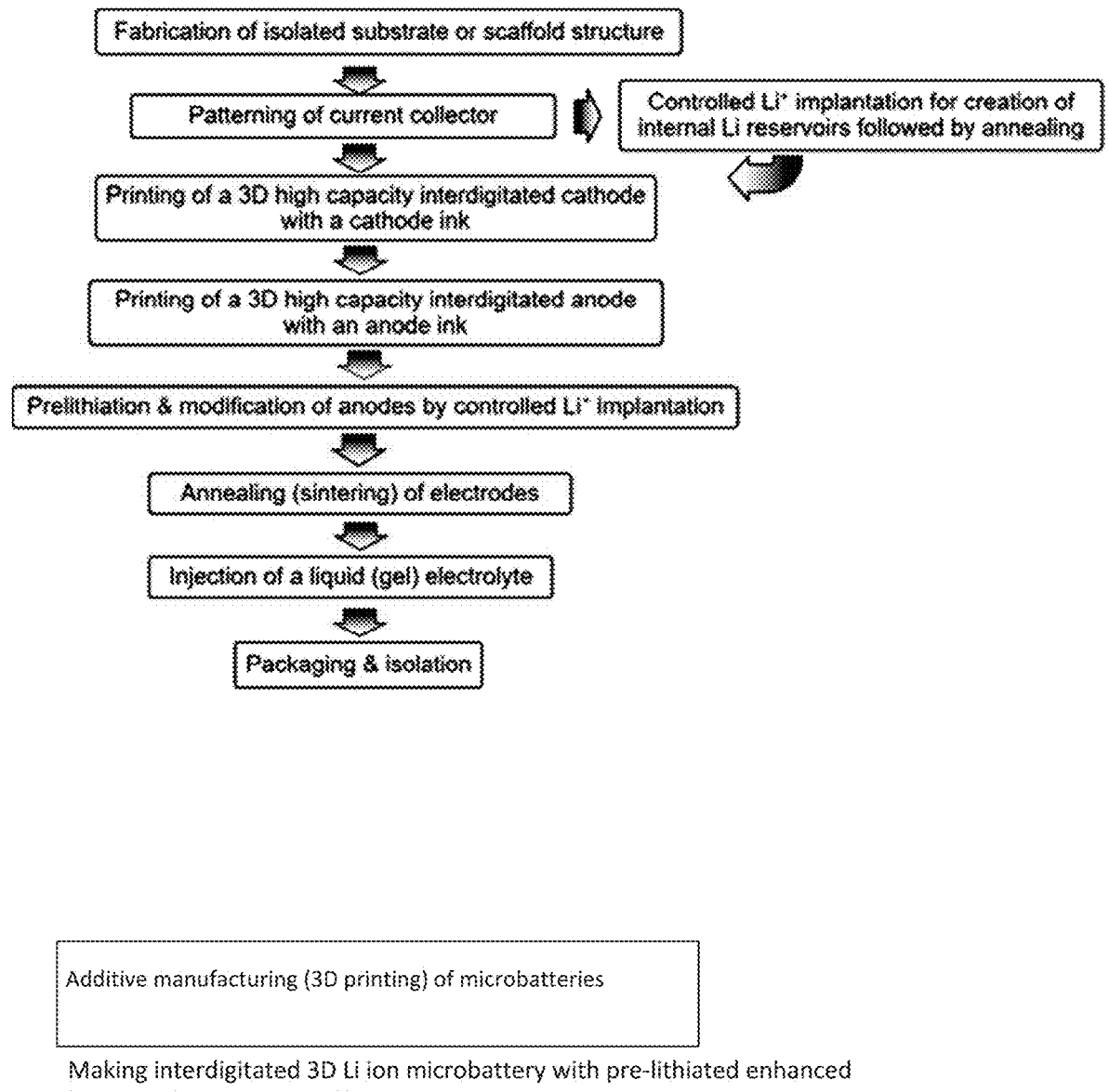
FIG. 15 shows steps in making a prelithiated lithium ion battery that includes interdigitated anode and cathode.

In an embodiment, with reference to FIG. 5 and FIG. 15, a process for making prelithiated lithium ion battery 200 includes: forming a first current collector; forming a second current collector; forming cathode 204 on the first current collector, cathode 204 including an interdigitated structure that is in electrical communication with the first current collector; forming anode 203 on the second current collector, anode 203 including a second interdigitated structure that is in electrical communication with the second current col lector; subjecting anode 203 to a lithium ion beam 210 including ion beam implanted lithium 211; implanting ion beam implanted lithium 211 from lithium ion beam 210 in anode 203 to prelithiate anode 203 with ion beam implanted lithium such that anode 203 includes ion beam implanted lithium that is present in absence of solid electrolyte interface composition in anode 203; annealing anode 203 and cathode 204 after implanting ion beam implanted lithium 211 in anode 203; and disposing electrolyte 223 on anode 203 and cathode 204 so that lithium ions are communicated through electrolyte 223 from anode 203 to cathode 204 or from cathode 204 to anode 203 to make prelithiated lithium ion battery 200.

The process further can include, prior to forming cathode 204 on the first current collector: subjecting the first current collector to lithium ion beam 210 including ion beam implanted lithium 211; implanting ion beam implanted lithium 211 from lithium ion beam 210 in the first current collector to prelithiate the first current collector with ion beam implanted lithium; and annealing the first current collector after implanting ion beam implanted lithium 211 in the first current collector.

The process further can include, prior to forming anode on the second current collector: subjecting the second current collector to lithium ion beam 210 including ion beam implanted lithium 211; and implanting ion beam implanted lithium 211 from lithium ion beam 210 in the second current collector to prelithiate the second current collector with ion beam implanted lithium.

It will be appreciated that in making prelithiated lithium ion battery 200 elements thereof are arranged with components to be in communication so that lithium ions from ion beam implanted lithium 211 separator 206 propagates from anode 203 with production of cathodic current collector 207 and solid electrolyte interface composition reception of cathodic member 213 by prelithiated battery composite 218 and arranging optical components to be in optical communication and electrical components to communicate electrical signals amongst the various electrical components.

Figure 6:
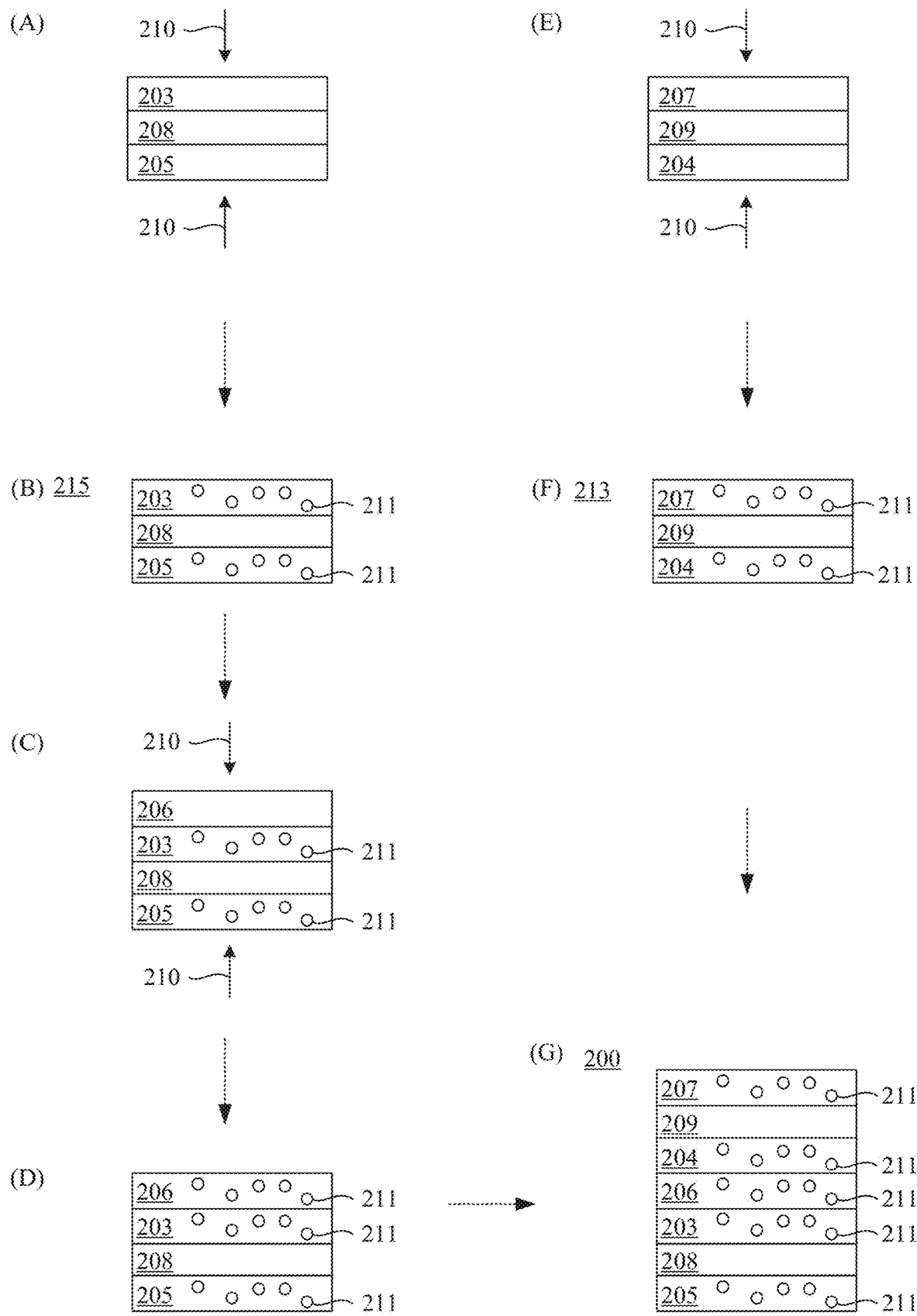
FIG. 6 shows steps in making a prelithiated lithium ion battery.
Figure 7:
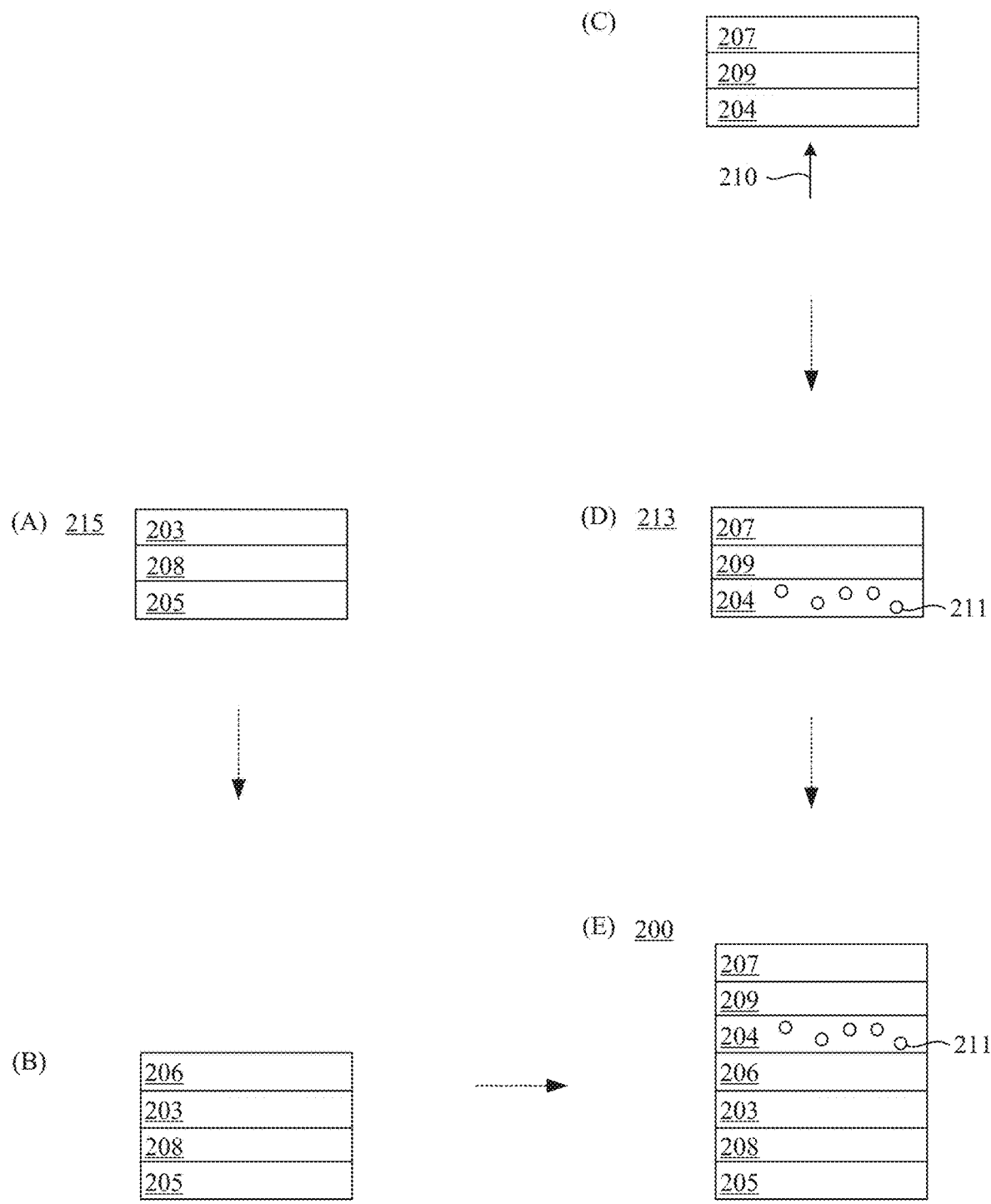
FIG. 7 shows steps in making a prelithiated lithium ion battery.
Figure 8:
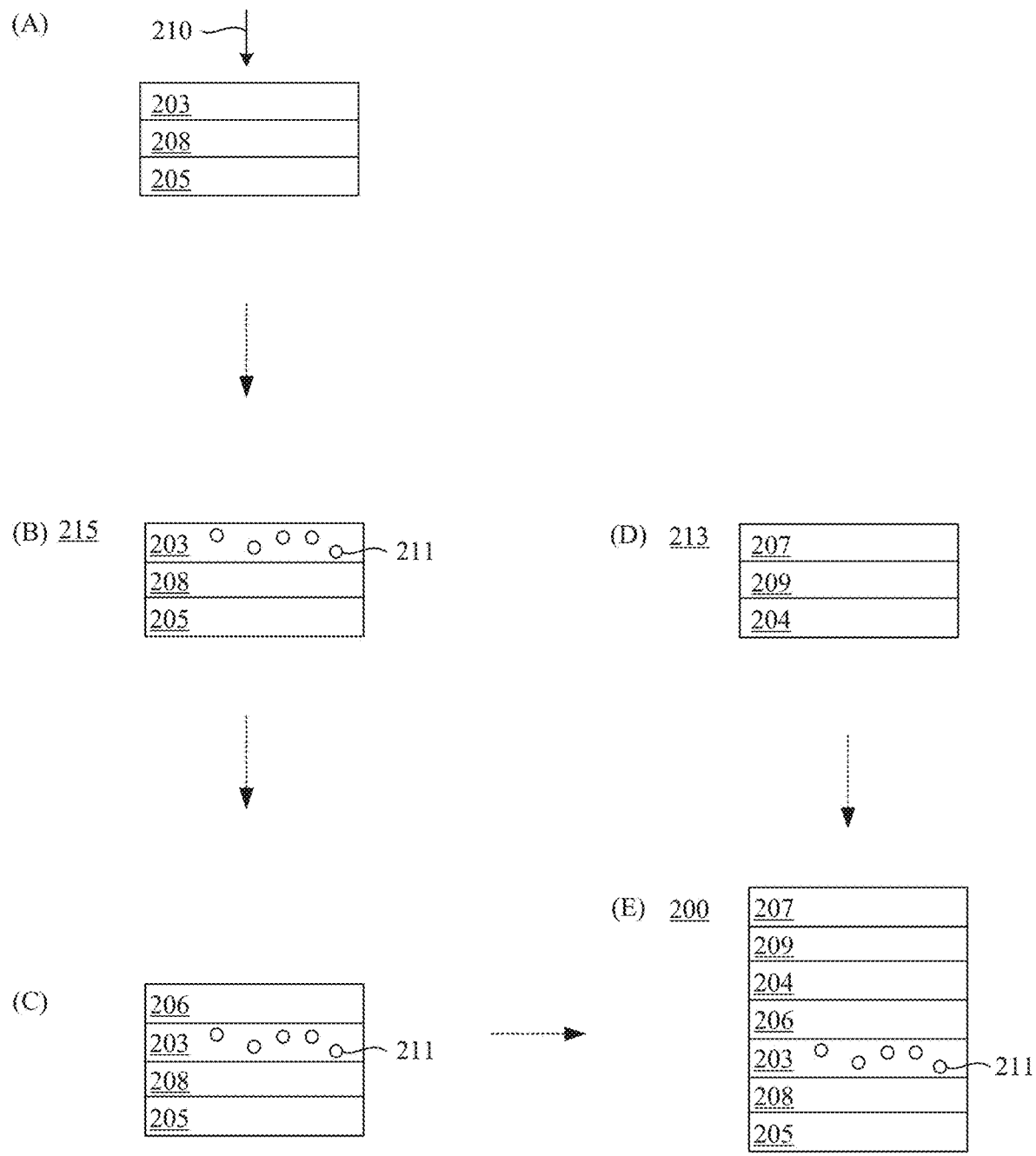
FIG. 8 shows steps in making a prelithiated lithium ion battery.
Figure 9:
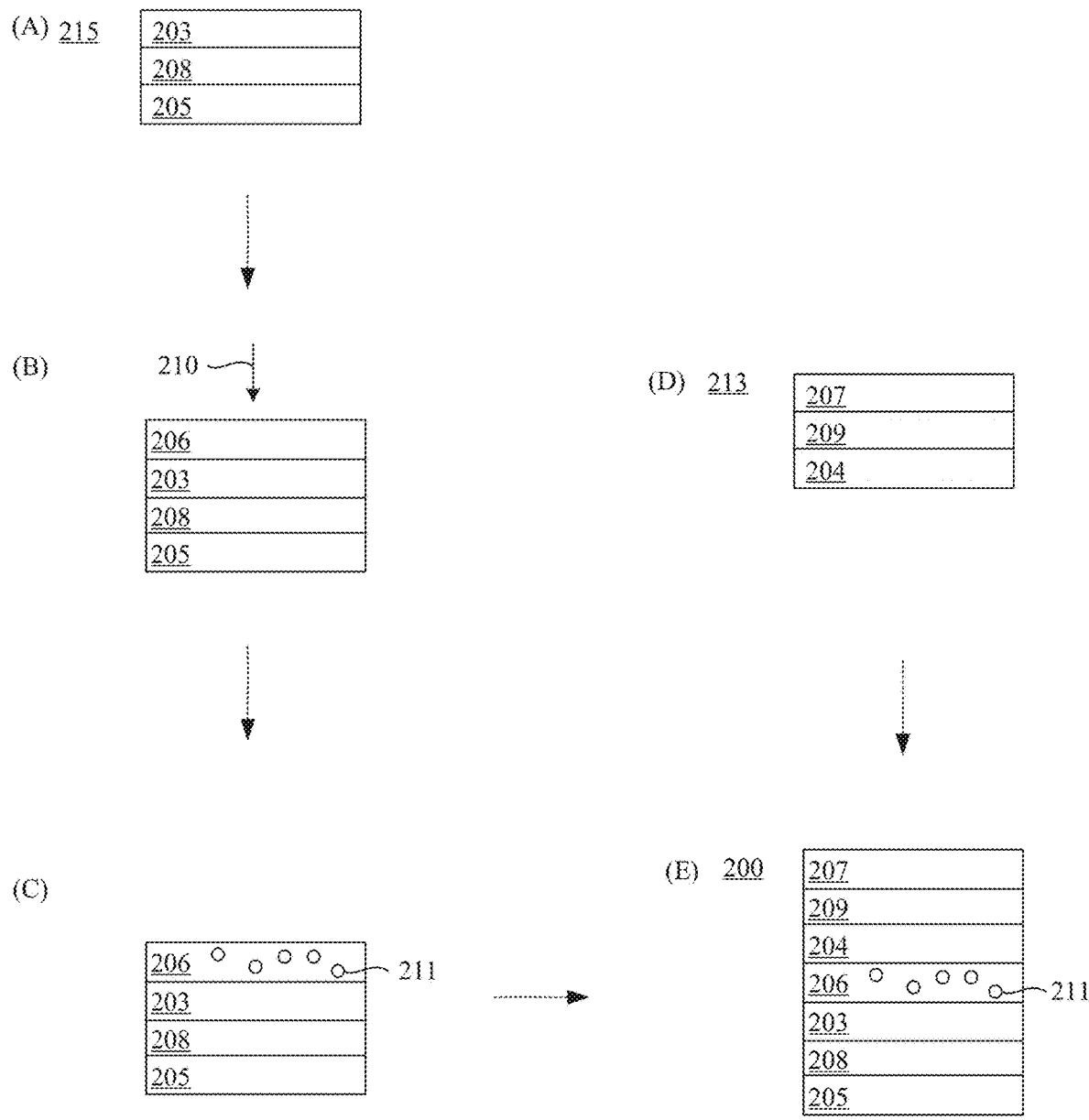
FIG. 9 shows steps in making a prelithiated lithium ion battery.

Controlled dose implantation of $Li^+$ for prelithiation of electrodes, materials for electrodes, and other components (e.g., separators, solid electrolytes, current collectors) for lithium-based electrochemical energy storage devices includes prelithiated lithium ion battery 200. FIG. 6 shows implanting $Li^+$ into different components to make prelithiated lithium ion battery 200. An exemplary source of $Li^+$ from lithium ion beam 210 is an ultra-cold focused $Li^+$ion beam device that locally implants $Li^+$ into a component for prelithiated lithium ion battery 200. Directly injecting dry $Li^+$ in a vacuum environment and in an absence of a liquid electrolyte for transport of $Li^+$ provides reduction of initial irreversible capacity losses due to the formation of solid electrolyte interface composition that can occur as a layer on an electrode that would affect $Li^+$ diffusion from electrolyte into electrodes. Solid electrolyte interface composition can form from electrochemical reactions of $Li^+$ in solution, liquid electrolyte, and an electrified interface of an electrode. Processes for making prelithiated lithium ion battery 200 avoid formation of solid electrolyte interface composition and provide direct prelithiation by dry, in-vacuo e.g., from a LiFIB, that is clean without side reactions from wet chemical or electrochemical processing. Making prelithiated lithium ion battery 200 can include various positive electrode material, negative electrode material, or electrochemical energy storage devices such as rechargeable powder-based lithium-ion or lithium-metal cells, lithium-sulfur (Li—S) cells, lithium-air (Li-air($O_2$)) batteries (FIG. 3), 3D structured and all solid-state Li-based batteries (FIG. 4, FIG. 5), supercapacitors symmetric, asymmetric, hybrid, or lithium-ion supercapacitors, hybrid energy storage or conversion systems, or their components as exemplary formats for cells.

Figure 10:
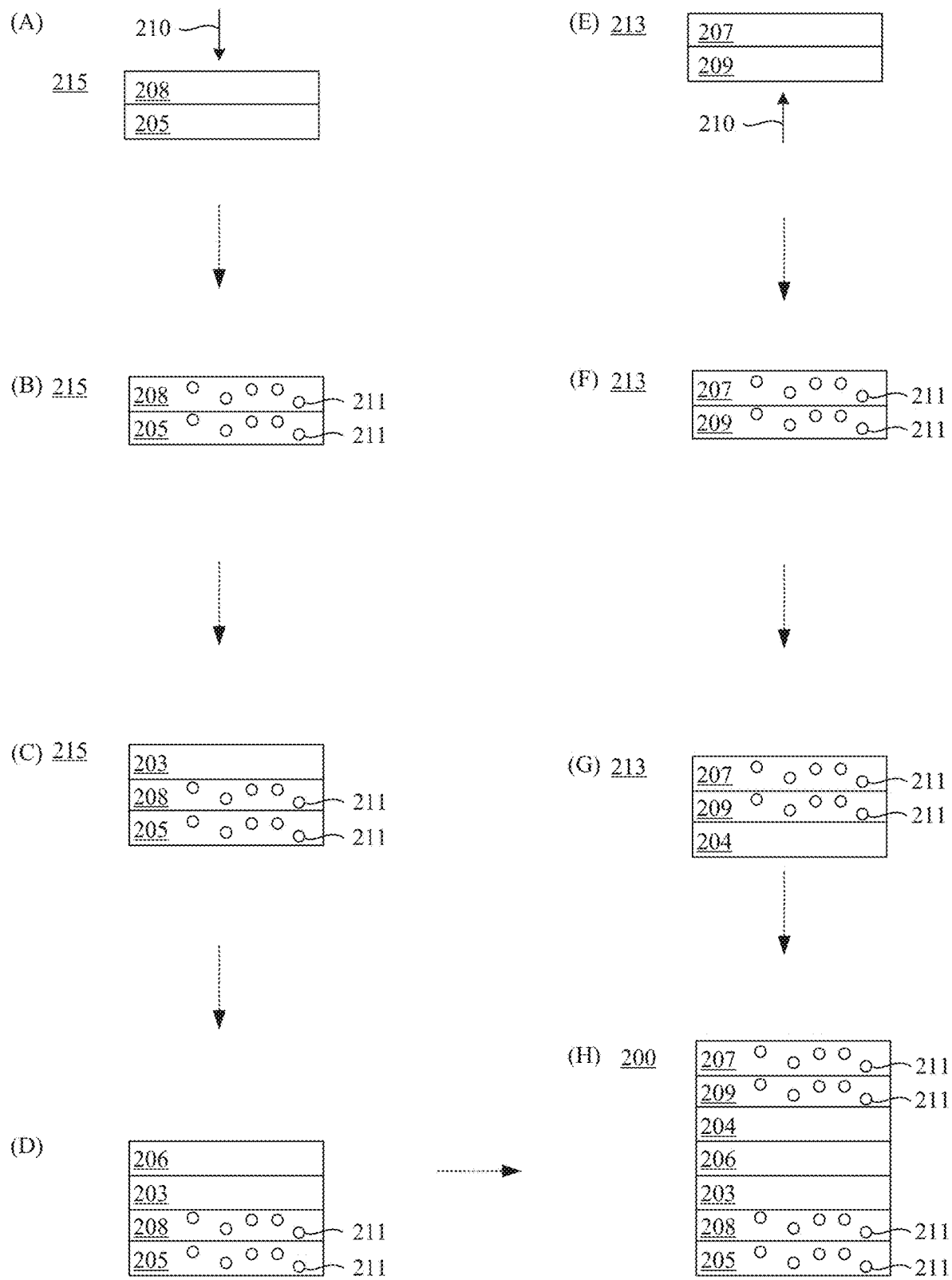
FIG. 10 shows steps in making a prelithiated lithium ion battery.

It should be appreciated that in making prelithiated lithium ion battery 200 prelithiation can be conducted on sheets, films, or powders of composite intercalation and conversion positive electrodes (FIG. 7), negative electrodes (FIG. 8), separators, solid electrolytes (FIG. 9), primer layers, or current collectors (FIG. 10).

Prelithiated lithium ion battery 200 and process herein overcome conventional practices for introducing lithium ions into the electrode materials. Conventional methods include chemical or electrochemical steps that use reactive Li-containing reagents such as sacrificial additives, donors, mixing with stabilized lithium metal powder (SLMP), organic solvents, or lithium salts in liquid electrolytes that wet metallic lithium foils to introduce lithium species into the material under an electrochemical potential. Under these conditions, lithium-consuming side reactions occur between components and create an SEI layer on the electrode. The SEI layer decreases battery capacity by increasing the impedance of a system and is a physical and chemical barrier that $Li^+$ must propagate through to reach active electrode material.

Making the prelithiated lithium ion battery 200 implants $Li^+$ directly in material without wet chemical or electrochemical prelithiation with liquid electrolytes or metallic lithium foils, sacrificial additives, donors, or mechanical mixing with SLMP that causes consumption of lithium for formation of passivation films or SEI. Through dry, in-vacuo prelithiation of making prelithiated lithium ion battery 200, lithium consuming side reactions are decreased or eliminated to reduce interfacial impedance in prelithiated lithium ion battery 200. Electrode materials prelithiated by injection of Li$^+$ have enhanced stability in dry and ambient air conditions and under ageing.

Making prelithiated lithium ion battery 200 overcomes further issues of conventional process, wherein conventional initial lithiation steps can be done on fully-assembled cells where there is a fixed amount of lithium. There, a fraction of Li is consumed in converting the electrode material to a lithiated state and creating the SEI layer. SEI grows, leading to capacity fading upon cycling of the cell. Making prelithiated lithium ion battery 200 is dry, in-vacuo lithiation that provides reduction of consumption of lithium and provides modification of the structure of the electrode materials by defect engineering during the interactions of implanted Li$^+$ with materials that lead to smaller cells and higher energy densities.

In conventional lithium batteries in a first cycle of operation, i.e., charge and discharge, Li$^+$ and electrons move from positively charged cathode to negatively charged anode and in a reverse process for further operation of the battery. When the potential of the anode is below 1 V vs. Li metal electrode, organic electrolytes can be reduced on an anode surface that produces a passivation film layer of SEI. SEI has a structure and chemical composition that includes inorganic and organic lithium compounds formed during growth of a passivation film. The first cycle of a conventional lithium battery can irreversibly consume, e.g., with graphite anodes, 5 to 20% of Li$^+$ that leads to losses of storage capacity and decreases Coulombic efficiency. Conventional cathodes include mixed lithium transition metal oxides (LiCoO$_3$, LiMn$_2$O$_4$ LiFePO$_4$, LiNiO$_2$, Li[Li,Ni,Mn,Co]O$_2$) and can have relatively low specific capacities that can be less than 300 mAh/g that is less than anodes in prelithiated lithium ion battery 200. If lithium loading is increased in conventional cathode material, such loading can reduce specific energy and energy density of the conventional battery. Beneficially, prelithiated lithium ion battery 200 overcomes these issues and fills the need for alternative methods to suppress irreversible losses and enhance the first cycle Coulombic efficiency as compared with conventional processes. Making prelithiated lithium ion battery 200 provides high-capacity prelithiation or pre-compensation of electrodes to compensate irreversible lithium losses that are problems with conventional Li-based electrochemical energy storage systems.

The articles and processes herein are illustrated further by the following Examples, which are non-limiting.

EXAMPLES

Example 1

Figure 11:
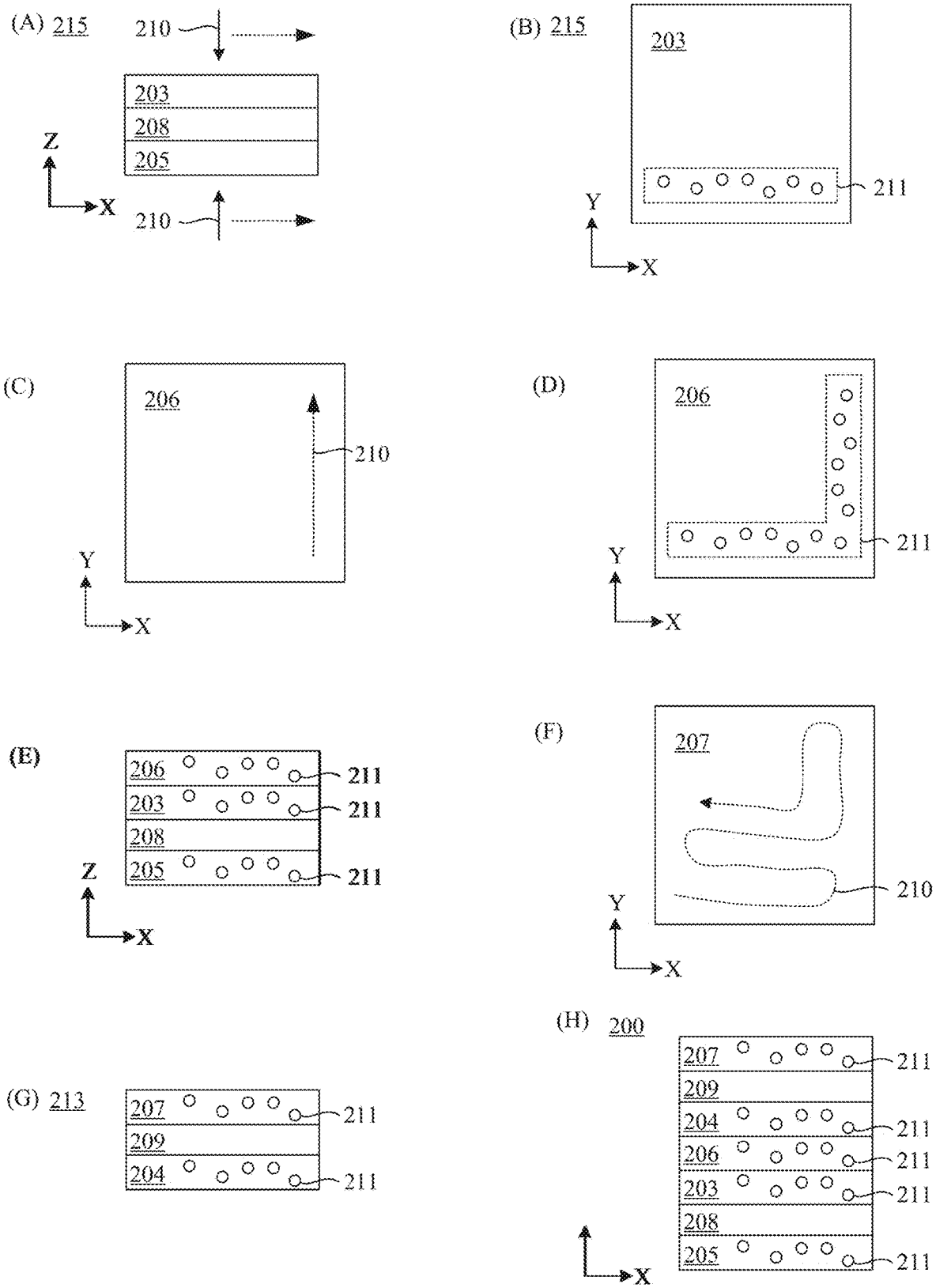
FIG. 11 shows steps in making a prelithiated lithium ion battery.
Figure 12:
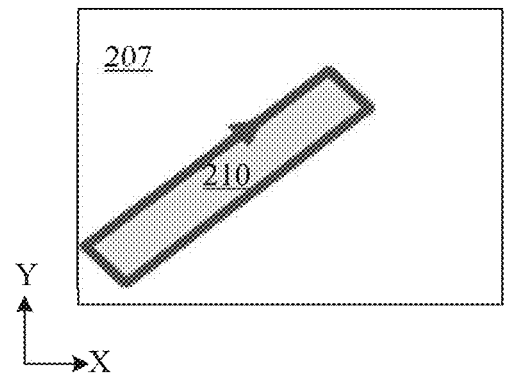
FIG. 12 shows a plurality of different paths of an ion beam on a component, e.g., a cathodic current collector, of a prelithiated lithium ion battery for a strip path in panel A, a rectangular path in panel B, an annular path in panel C, and an interdigitated path in panel D.
Figure 12:
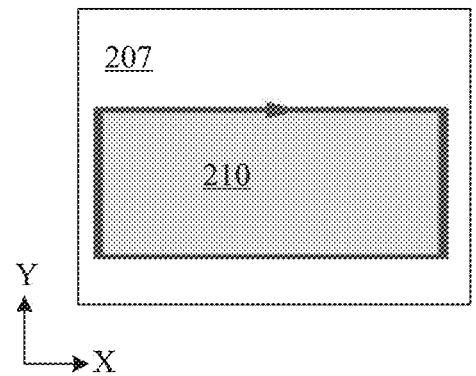
Figure 12:
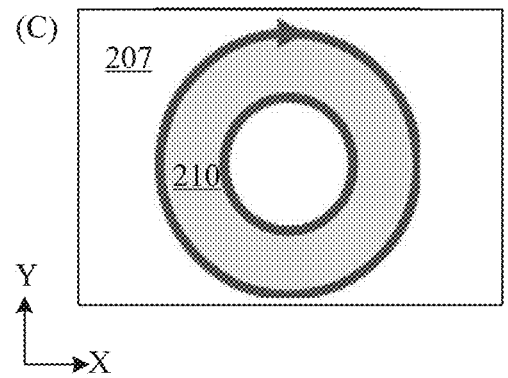
Figure 12:
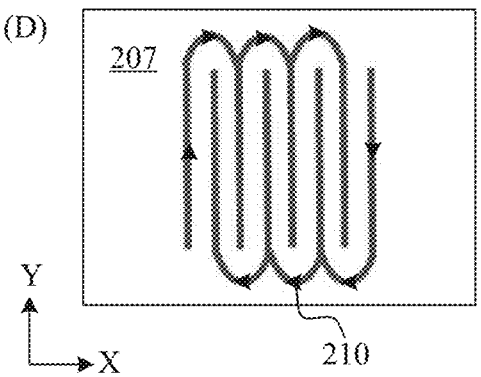
Figure 16:
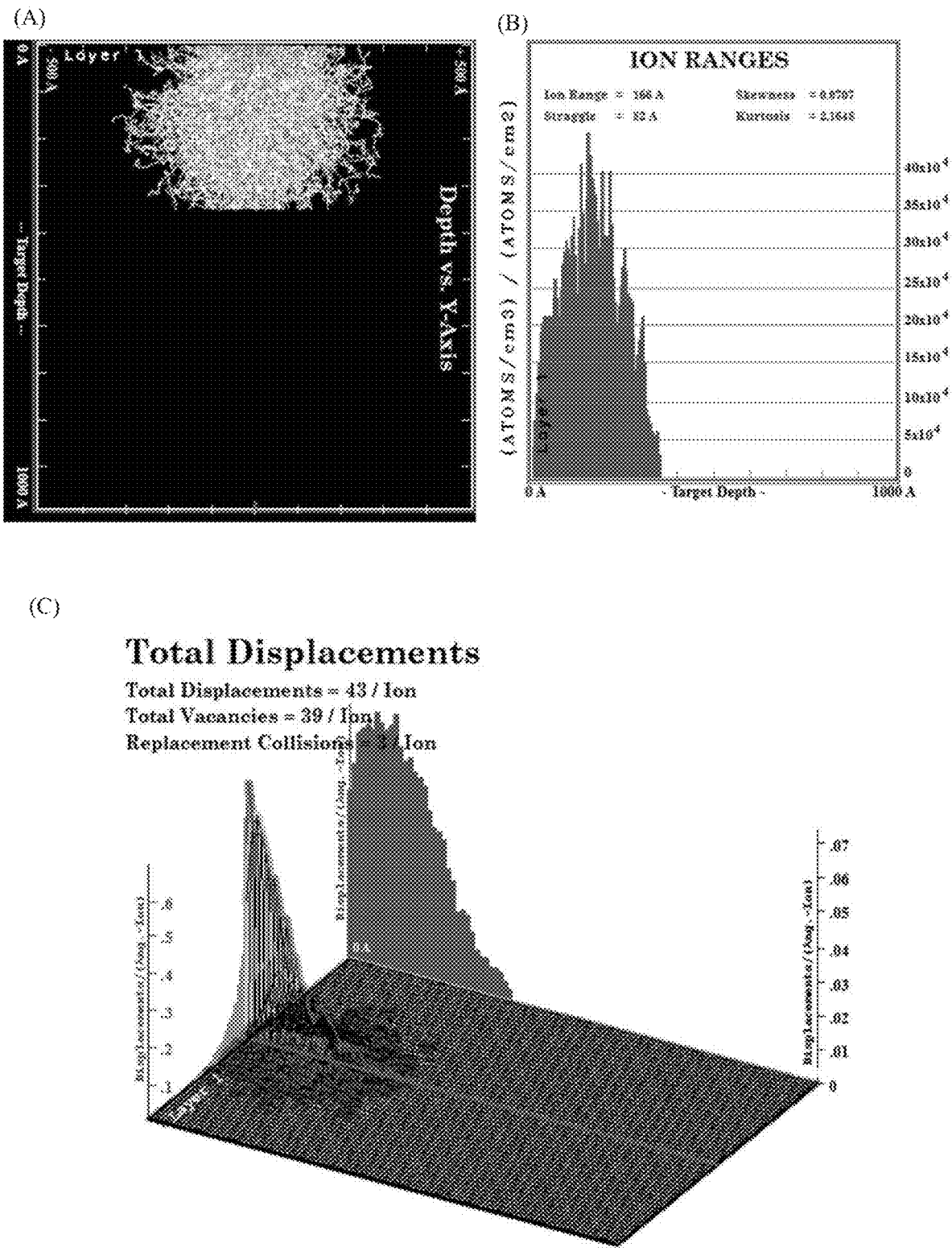
FIG. 16 shows, for an ion beam that includes lithium ions (Li$^+$) at 2 keV, Li$^+$ ion implantation depth and lateral distributions in panel A, depth versus ion current in panel B, and total displacement in panel C for Monte Carlo simulations for a 35-nm thick Si anode subjected to the 2 keV Li$^+$.
Figure 17:
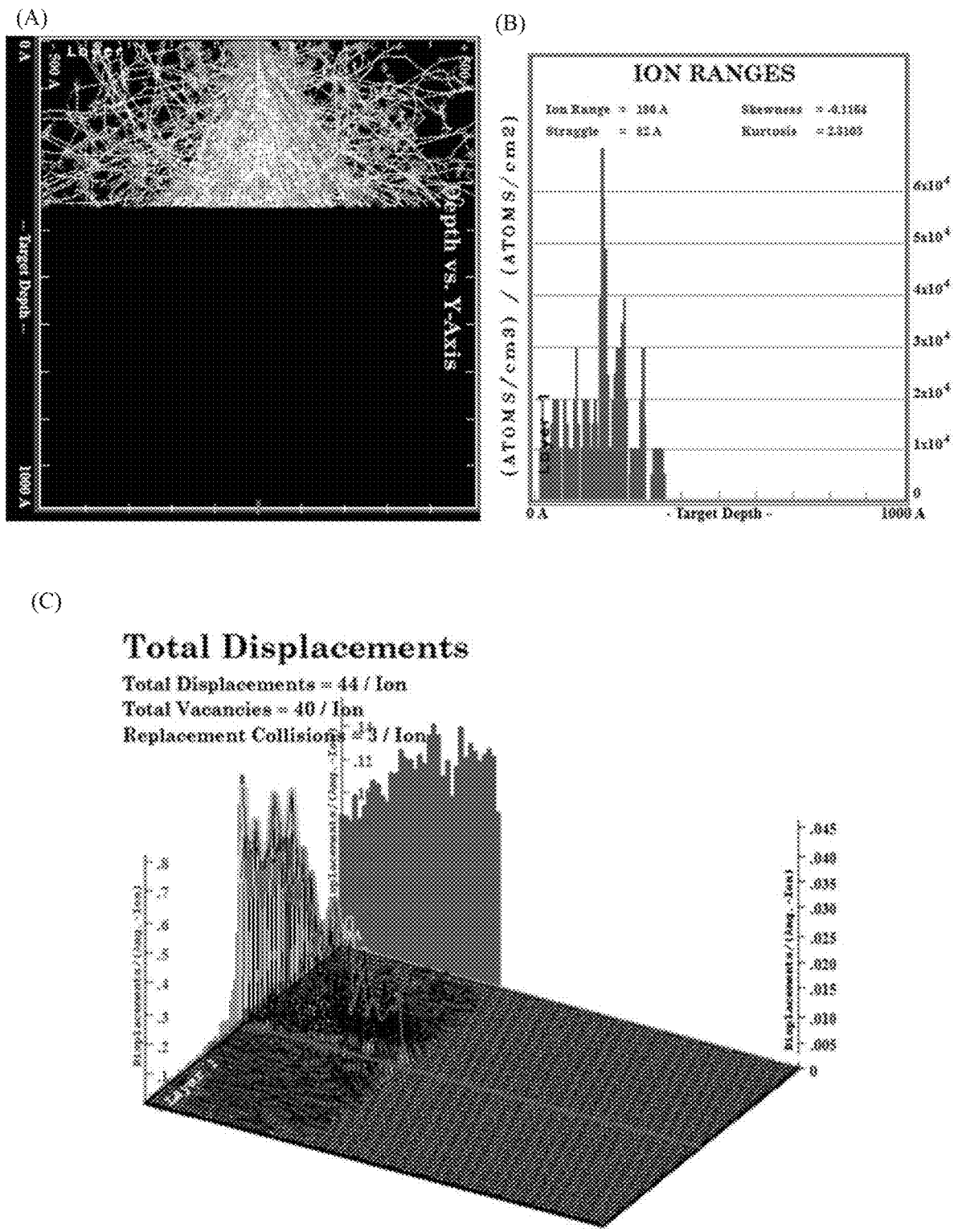
FIG. 17 shows, for an ion beam that includes lithium ions (Li$^+$) at 10 keV, Li$^+$ ion implantation depth and lateral distributions in panel A, depth versus ion current in panel B, and total displacement in panel C for Monte Carlo simulations for a 35-nm thick Si anode subjected to the 10 keV Li$^+$.

Li$^+$ implantation depth and lateral distributions for selected materials can be controlled by energy of Li$^+$ (, e.g., from 0.5 to 100 keV), select ion current, or size or shape of an exposed area subjected to lithium ion beam 210. In this respect, Monte Carlo simulations for a 35-nm thick Si anode subject to 2 keV and 10 keV Li+ are shown respectively in FIG. 16 and FIG. 17. Li$^+$ doses from 10$^{10}$ ions/cm$^2$ to 10$^{18}$ ions/cm$^2$ can be controlled by monitoring current received by, e.g., a Faraday cup. For a three-dimensional (3D) prelithiated lithium ion battery 200, such as a pin-sized interdigital Li-ion micro battery printed in a 3D pack, spatially-resolved 3D Li$^+$ implantation can be performed in electrode areas varying by size and shape with low-energy scanning LiFIB as shown in FIG. 11. FIG. 12 shows exemplary implantation paths of Li$^+$ on implantable areas, e.g., of cathodic current collector 207 although this applies to other components of prelithiated lithium ion battery 200 as well.

Example 2

Figure 19:
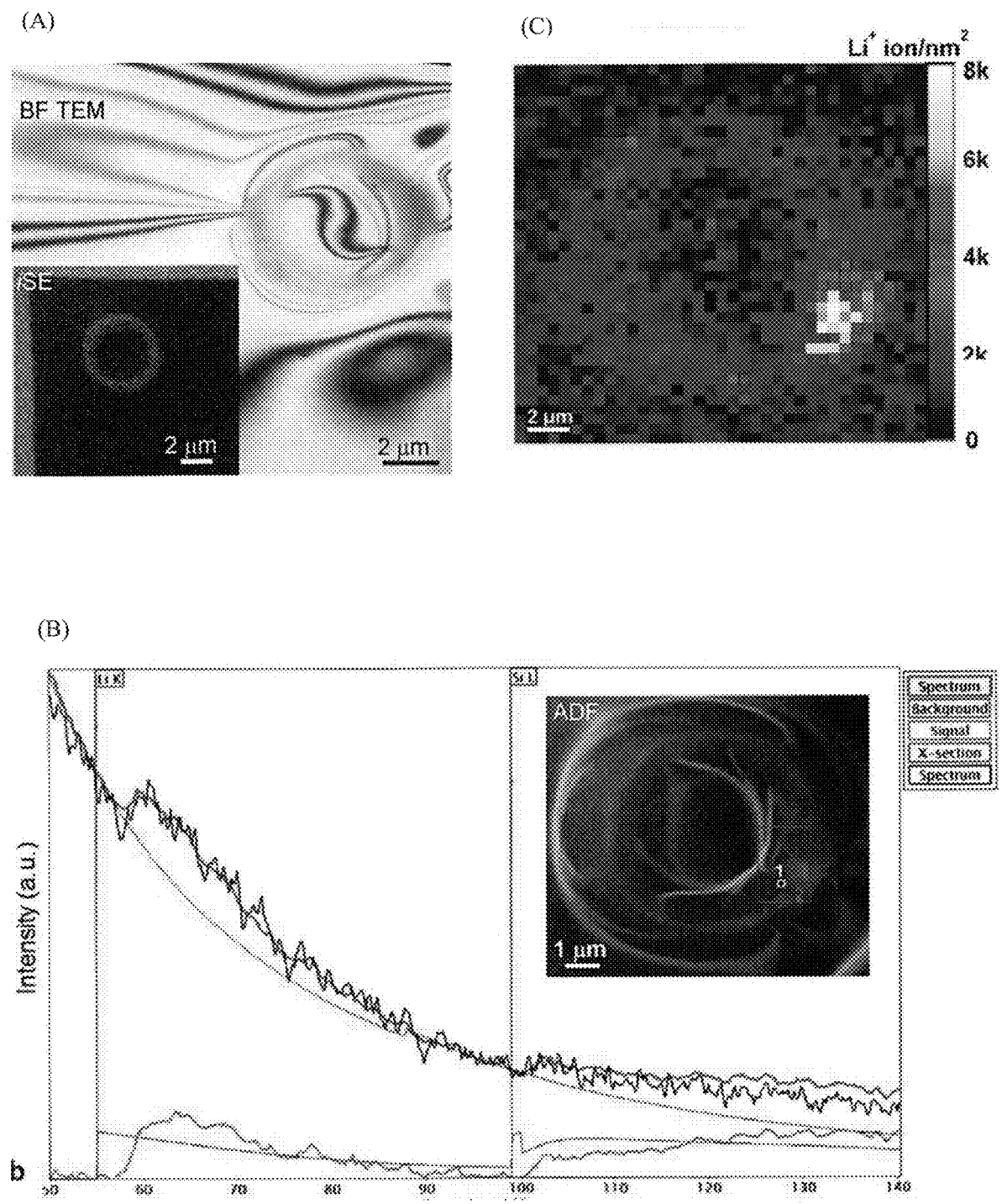
FIG. 19 shows in panel A an electron micrograph of a silicon membrane with an inset that shows an ion-induced secondary electron (iSE) image of annulus of ion beam implanted lithium disposed in the silicon membrane after lithium implantation; panel B shows normalized electron energy-loss (EEL) spectra from site 1 and site 2 as marked in an annular dark-field (ADF) scanning TEM (STEM) image shown in the inset, wherein EEL spectra show a Li K edge at 55 eV and the Si L$_{2,3}$-edge at 99 eV energy loss; and panel C shows Li density map for lithium distributions with Li$^+$ concentrations from 0 to 8·10$^{17}$ ion/cm$^2$.

Besides a lithium fast ion bombardment (LiFIB) beam, dry ion implantation can involve ionic gases of dopants (e.g., B, P, As, Sb) accelerated in an electrical field varying from 100 eV up to 10 MeV with injected of such into a semi-conductor material (e.g., Si, GaAs) under a vacuum of 10$^{-5}$ to 10$^{-7}$ Torr. At energies below 100 keV, doses can be range from 10$^{10}$ up to 10$^{15}$ ion/cm$^2$ for an achievable ion current and up to 10$^{17}$ ion/cm$^2$ with a high current-high dose implanter. High current-high dose Li$^+$ implanters and compact low-energy Li$^+$ sources can be overcome these limitations. A cold-atom scanning LiFIB system with a Li$^+$ source (FIG. 18) provides a Li$^+$ number density up to 8×10$^{17}$ Li$^+$/cm$^{2+}$ in selected shapes of a Si membrane (FIG. 19). The implantation area can be subject to flooding Li$^+$, focused Li$^+$ beam, or rastering of Li$^+$ beam on a select area of material subject to lithium ion beam 210. FIG. 19A shows a low-magnification bright field transmission electron microscope (BF-TEM) image of an annular ion beam implanted lithium 211 for an area in a corner of a 100 μm×100 μm, 35 nm-thick window of <100> c-Si membrane. The bottom inset in FIG. 19A shows ion-induced secondary electron (iSE) image of the area after implantation in LiFIB. FIG. 19B shows normalized electron energy-loss (EEL) spectra extracted from site 1 and site 2 as marked in annular dark-field (ADO scanning TEM (STEM) image (inset). EEL spectra show Li K-edge at 55 eV and the Si$_{2,3}$-edge at 99 eV energy loss. FIG. 19C shows Li areal density map for lithium distributions with Li$^+$ concentrations from 0 to 8·10$^{17}$ Li$^+$/cm$^2$.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A process for making a prelithiated lithium ion battery, the process comprising:
   subjecting the first battery member to a lithium ion beam comprising lithium ions;
   implanting ion beam implanted lithium from the lithium ion beam in the first battery member to prelithiated the first battery member;
   disposing a second battery member on a first battery member;
   disposing a third battery member on the second battery member so that the second battery member is interposed between the first battery member and the third battery member to form a prelithiated battery composite; and
   annealing the prelithiated battery composite to form the prelithiated lithium ion battery such that the prelithiated lithium ion battery has an absence of a solid electrolyte interface composition in a portion of the first battery member subjected to implanting the ion beam implanted lithium from the lithium ion beam.

2. The process of claim 1, further comprising, prior to disposing the second battery member on the first battery member:
   subjecting the second battery member to the lithium ion beam; and
   implanting the ion beam implanted lithium from the lithium ion beam in the second battery member to prelithiated the second battery member.

3. The process of claim 2, further comprising, prior to disposing the third battery member on the second battery member:
   subjecting the third battery member to the lithium ion beam; and
   implanting the ion beam implanted lithium from the lithium ion beam in the third battery member to prelithiated the second battery member.

4. The process of claim 1, further comprising, prior to disposing the third battery member on the second battery member:
   subjecting the third battery member to the lithium ion beam; and
   implanting the ion beam implanted lithium from the lithium ion beam in the third battery member to prelithiated the second battery member.

5. The process of claim 1, wherein:
   the first battery member comprises a cathodic member or an anodic member;
   the second battery member comprises an intermediate member;
   when the first battery member is the cathodic member, the third battery member comprises the anodic member; and
   when the first battery member is the anodic member, the third battery member comprises the cathodic member.

6. The process of claim 5, wherein:
   the first battery member comprises the anode member; and
   the third battery member comprises the cathode member.

7. A process for making a prelithiated lithium ion battery, the process comprising:
   disposing electrode particles in a vacuum environment;
   subjecting the electrode particles to a lithium ion beam comprising ion beam implanted lithium;
   implanting ion beam implanted lithium from the lithium ion beam in the electrode particles to prelithiated the electrode particles with ion beam implanted lithium;
   combining, after implanting ion beam implanted lithium in the electrode particles, the electrode particles with a conductive additive and a binder to form an electrode composition;
   disposing, as a first electrode, the electrode composition on a first current collector to form a first electrode member such that the first electrode comprises the ion beam implanted lithium that is present in absence of solid electrolyte interface composition in the first electrode;
   annealing the first electrode member; and
   disposing the first electrode member on a second electrode member to make the prelithiated lithium ion battery.

8. The process of claim 7 for making the prelithiated lithium ion battery, the process further comprising, prior to disposing the first electrode on the first current collector:
   subjecting the first current collector to the lithium ion beam comprising ion beam implanted lithium;
   implanting ion beam implanted lithium from the lithium ion beam in the first current collector to prelithiated the first current collector with ion beam implanted lithium, wherein the first current collector comprises the ion beam implanted lithium that is present in absence of solid electrolyte interface composition in the first current collector; and
   annealing the first current collector.

9. The process of claim 7 for making the prelithiated lithium ion battery, the process further comprising, prior to disposing the first electrode member on the second electrode member:
   disposing, as a second electrode, the electrode composition on a second current collector to form the second electrode member such that the second electrode comprises the ion beam implanted lithium that is present in absence of solid electrolyte interface composition in the second electrode; and
   annealing the second electrode member.

10. The process of claim 9 for making the prelithiated lithium ion battery, the process further comprising, prior to disposing the second electrode on the second current collector:
   subjecting the second current collector to the lithium ion beam comprising ion beam implanted lithium;
   implanting ion beam implanted lithium from the lithium ion beam in the second current collector to prelithiated the second current collector with ion beam implanted lithium, wherein the second current collector comprises the ion beam implanted lithium that is present in absence of solid electrolyte interface composition in the second current collector; and annealing the first current collector.

11. A process for making a prelithiated lithium ion battery, the process comprising:
forming a first current collector;
forming a cathode on the first current collector;
forming an electrolyte on the cathode;
forming an anode on the cathode;
subjecting the anode to a lithium ion beam comprising ion beam implanted lithium;
implanting ion beam implanted lithium from the lithium ion beam in the anode to prelithiated the anode with ion beam implanted lithium such that the anode comprises the ion beam implanted lithium that is present in absence of solid electrolyte interface composition in the anode;
annealing the anode after implanting ion beam implanted lithium in the anode;
forming a second current collector on the anode; and
annealing the second current collector to form the prelithiated lithium ion battery.

12. The process of claim 11 for making the prelithiated lithium ion battery, the process further comprising, prior to forming the cathode on the first current collector:
subjecting the first current collector to the lithium ion beam comprising ion beam implanted lithium;
implanting ion beam implanted lithium from the lithium ion beam in the first current collector to prelithiated the first current collector with ion beam implanted lithium; and
annealing the first current collector after implanting the ion beam implanted lithium in the first current collector.

13. The process of claim 11 for making the prelithiated lithium ion battery, the process further comprising, prior to annealing the second current collector:
subjecting the second current collector to the lithium ion beam comprising ion beam implanted lithium; and
implanting ion beam implanted lithium from the lithium ion beam in the second current collector to prelithiated the second current collector with ion beam implanted lithium.

14. A process for making a prelithiated lithium ion battery, the process comprising:
forming a first current collector;
forming a second current collector;
forming a cathode on the first current collector, the cathode comprising an interdigitated structure that is in electrical communication with the first current collector;
forming an anode on the second current collector, the anode comprising a second interdigitated structure that is in electrical communication with the second current collector;
subjecting the anode to a lithium ion beam comprising ion beam implanted lithium;
implanting ion beam implanted lithium from the lithium ion beam in the anode to prelithiated the anode with ion beam implanted lithium such that the anode comprises the ion beam implanted lithium that is present in absence of solid electrolyte interface composition in the anode;
annealing the anode and the cathode after implanting ion beam implanted lithium in the anode; and
disposing an electrolyte on the on the cathode and the anode so that lithium ions are communicated through the electrolyte from the anode to the cathode or from the cathode to the anode to make the prelithiated lithium ion battery.

15. The process of claim 14 for making the prelithiated lithium ion battery, the process further comprising, prior to forming the cathode on the first current collector:
subjecting the first current collector to the lithium ion beam comprising ion beam implanted lithium;
implanting ion beam implanted lithium from the lithium ion beam in the first current collector to prelithiated the first current collector with ion beam implanted lithium; and
annealing the first current collector after implanting the ion beam implanted lithium in the first current collector.

16. The process of claim 11 for making the prelithiated lithium ion battery, the process further comprising, prior to forming the anode on the second current collector:
subjecting the second current collector to the lithium ion beam comprising ion beam implanted lithium; and
implanting ion beam implanted lithium from the lithium ion beam in the second current collector to prelithiated the second current collector with ion beam implanted lithium.

* * * * *